April 18, 1967 V. H. PAVLECKA 3,314,647

HIGH ENERGY CONVERSION TURBINES

Filed Dec. 16, 1964

19 Sheets-Sheet 1

INVENTOR.
VLADIMIR H. PAVLECKA
BY
Nicholas T. Volk
ATTORNEY.

RADIAL CENTRIFUGAL GAS TURBINE

INVENTOR.
VLADIMIR H. PAVLECKA
BY
Nicholas T. Volk
ATTORNEY.

April 18, 1967 V. H. PAVLECKA 3,314,647

HIGH ENERGY CONVERSION TURBINES

Filed Dec. 16, 1964

19 Sheets-Sheet 3

INVENTOR.
VLADIMIR H. PAVLECKA
BY
Nicholas T. Volsk
ATTORNEY.

April 18, 1967 V. H. PAVLECKA 3,314,647

HIGH ENERGY CONVERSION TURBINES

Filed Dec. 16, 1964

19 Sheets-Sheet 4

INVENTOR.
VLADIMIR H. PAVLECKA
BY
Nicholas T. Volsk
ATTORNEY.

INVENTOR.
VLADIMIR H. PAVLECKA
BY Nicholas T. Volk
His ATTORNEY.

April 18, 1967 V. H. PAVLECKA 3,314,647

HIGH ENERGY CONVERSION TURBINES

Filed Dec. 16, 1964

19 Sheets-Sheet 6

INVENTOR.
VLADIMIR H. PAVLECKA
BY
Nicholas T. Volk
ATTORNEY.

April 18, 1967

V. H. PAVLECKA 3,314,647

HIGH ENERGY CONVERSION TURBINES

Filed Dec. 16, 1964

19 Sheets-Sheet 7

INVENTOR.
VLADIMIR H. PAVLECKA
BY
Nicholas T. Volk
ATTORNEY.

April 18, 1967 V. H. PAVLECKA 3,314,647

HIGH ENERGY CONVERSION TURBINES

Filed Dec. 16, 1964

19 Sheets-Sheet 8

$$\frac{C_1}{a_{c_1}} = \frac{W'_{16}}{a_{c'16}} = M_a = CONST.$$

INVENTOR.
VLADIMIR H. PAVLECKA
BY
Nicholas T Volsk
His Attorney.

April 18, 1967 V. H. PAVLECKA 3,314,647

HIGH ENERGY CONVERSION TURBINES

Filed Dec. 16, 1964

19 Sheets-Sheet 9

$$\frac{C_1}{a_{C_1}} = \frac{W'_{16}}{a'_{C_{16}}} = M_a = \text{VARIABLE}$$

INVENTOR.
VLADIMIR H. PAVLECKA

BY Nicholas T Volk
his attorney

INVENTOR.
VLADIMIR H. PAVLECKA
BY Nicholas T Volsky
his attorney

INVENTOR.
VLADIMIR H. PAVLECKA
BY
his attorney.

VELOCITY VECTOR DIAGRAM FOR SINGLE-ROTATION TURBINE SYSTEM:

INVENTOR.
VLADIMIR H. PAVLECKA
BY
Nicholas T. Volk
ATTORNEY.

April 18, 1967

V. H. PAVLECKA 3,314,647

HIGH ENERGY CONVERSION TURBINES

Filed Dec. 16, 1964

19 Sheets-Sheet 13

INVENTOR.
VLADIMIR H. PAVLECKA

BY Nicholas T. Volsk
his Attorney.

April 18, 1967 V. H. PAVLECKA 3,314,647

HIGH ENERGY CONVERSION TURBINES

Filed Dec. 16, 1964 19 Sheets-Sheet 14

INVENTOR.
VLADIMIR H. PAVLECKA

BY Nicholas T. Volsky

ATTORNEY.

INVENTOR.
VLADIMIR H. PAVLECKA
BY Nicholas T. Volk
ATTORNEY.

INVENTOR.
VLADIMIR H. PAVLECKA
BY Nicholas T Volk
ATTORNEY.

INVENTOR.
VLADIMIR H. PAVLECKA
BY Nicholas T Volk
ATTORNEY.

INVENTOR.
VLADIMIR H. PAVLECKA
BY Nicholas T. Volk
ATTORNEY.

April 18, 1967 V. H. PAVLECKA 3,314,647

HIGH ENERGY CONVERSION TURBINES

Filed Dec. 16, 1964

19 Sheets-Sheet 19

INVENTOR.
VLADIMIR H. PAVLECKA
BY
Nicholas T. Volok
ATTORNEY.

United States Patent Office 3,314,647

Patented Apr. 18, 1967

3,314,647

HIGH ENERGY CONVERSION TURBINES

Vladimir H. Pavlecka, 1176 Monument St., Pacific Palisades, Calif. 90272

Filed Dec. 16, 1964, Ser. No. 420,485
42 Claims. (Cl. 253—16.5)

This invention relates to radial, centrifugal flow and axial flow multi-stage turbines, the turbines being either steam or gas turbines, and the methods of their operation.

This application for Letters Patent is a continuation-in-part application of the application S.N. 283,658, filed May 17, 1963, entitled "Centrifugal Flow Turbine," which is also a continuation-in-part application of the application S.N. 18,290, filed March 29, 1960, entitled "Centrifugal Flow Turbines," which is a divisional application of my parent application S.N. 513,947, filed June 8, 1955, and entitled "Radial Dynamic Machines Including Centripetal Flow Compressors and Centrifugal Flow Turbines," which, in turn, is the continuation-in-part application of still earlier parent application S.N. 217,347, filed March 24, 1951, now U.S. Patent No. 2,804,747, issued September 3, 1957, and entitled "Gas Turbine Power Plant."

The parent application discloses the centripetal flow compressors, and radial flow turbomachines in general, while the earlier divisional and continuation-in-part applications disclose the centrifugal flow turbines. This application adds an additional description and application of the same principles, disclosed in the earlier cases, to the axial flow single or double rotation turbines.

In any turbine having either radial or axial flow and no expansion stator at the entry into the first stage of the turbine, whether it is a steam turbine or a gas turbine, the working fluid reaching the first stage of the turbine has, and must have, a low entry velocity. This is due to the fact that it is necessary to have as low velocities as possible through the superheater in a steam turbine and through a combustion chamber in a gas turbine to keep the pressure drops through these heaters as low as possible. With the entry velocity thus being low, it becomes difficult to obtain high level energy conversions in the upstream stages of the turbine. Therefore, as long as the entry velocity into the first rotatable stage is low, and, especially, there is only a small peripheral component of this entry velocity, the energy conversion of the upstream stages is also low. One way of obtaining a high rate of expansion to provide the first rotatable stage with a supersonic expansion nozzle at its exit without any stator, as disclosed in the co-pending application S.N. 217,347, filed March 24, 1951. However, even such increase in expansion in the first rotatable stage, without any input stator, is less effective than the one obtained with the input stator. In one version of the invention, fluid, after it leaves a superheater or a combustion chamber, enters an expansion stator at low velocity and is expanded through this stator, with the result that it leaves this stator at high subsonic or supersonic velocity. All subsequent stages then are also made to have energy conversions equal to the energy conversion of the first rotatable stage. Therefore, the energy conversion of the first stage and all of the subsequent stages, up to and including the last stage, is increased because of the high entry velocity into the first rotatable turbine stage and because of the ability of the turbine to work with a higher exit Mach number in all of the stages. With the entry velocity being high and the entire turbine being considered a single fluid-dynamic unit, it becomes possible to design a turbine where all of the stages, including the innermost stages, have reasonably constant and higher levels of energy conversions than the prior art turbines, with the result that the innermost stages contribute their proper share in energy conversions as compared to the outermost stages. It thus becomes possible to decrease very markedly the total number of the required stages. The over-all energy conversion of the turbine is increased because of two considerations: the first increase is due to the increase in the energy conversion performed by the innermost stages, and the second increase is due to the ability to operate all of the stages at higher and substantially constant Mach number through the entire turbine than according to the known methods currently used with the centrifugal and axial flow turbines. All known axial flow turbines operate at varying kinetic energy and Mach number from stage-to-stage, as will be pointed more in detail later.

In the centrifugal flow turbines, the known method is based on the progressively increasing absolute and relative fluid velocities which increase with the increase of the diameter of the stages at a constant rate and, therefore, the energy conversion increases at a fixed large rate from the inner radial flow stage to the outer radial flow stage. The prior art method, known as the method of congruent triangles used in centrifugal radial flow turbines, is predicated in the basic concept that the small diameter innermost turbine stages, having low peripheral velocities as compared to the high peripheral velocities of the outer stages, are not capable of converting effectively the very high kinetic energies, which may be produced by the very high velocities of expansion, into mechanical work. The method of fluid expansion now in use in the radical flow machines is described in "Steam Turbine Theory and Practice" by V. S. Kearton, published by Isaac Pitman, London, 1945, where it is stated that the expansion in the stages of the Ljungstrom turbines is proportional to the diameter of a given stage and that all velocity triangles of all stages are congruent, which means that the angles of the velocity vectors with respect to the radius line and with respect to the tangents to the stages, are constant in all stages and increase in size from the first stage to the last stage. The above means that in all existing centrifugal flow turbines, the initial velocities are very low and the downstream velocities are very high and, therefore, the small diameter stages do very little energy conversion of heat into work, while the large diameter stages do most of the energy conversion.

In the centrifugal flow turbines disclosed here, energy conversions of all the rotatable stages are made subtantially equal to the last rotatable stage by (a) Introducing a working fluid, preferably, into the first rotatable stage of a contra-rotatable radial centrifugal flow turbine at high absolute entry velocity, high exit Mach number (1.0–1.30 for steam), high total kinetic energy, high absolute momentum and energy conversion per stage, and maintaining these energy parameters substantially constant and at a higher constant level throughout the turbine than in the known contrarotatable radial centrifugal flow turbines, (b) Decreasing the total angle of turning, $\theta$, from the innermost stages to the outermost stage, i.e., as a direct function of the radius of the turbine, and increasing the expansion component, $\theta_e$ of the total turning angle, $\theta$, from the first rotatable stage to the last rotatable stage;

(c) Increasing the rate of expansion in the subsonic version of the turbine, with the increase of the diameter of the stage by making the rate of convergence of the flow channels a function of the diameter of the stages;

(d) Increasing the absolute leaving velocity of the working fluid inversely proportional to the diameter of the stage;

(e) In the first version, making the local exit Mach number substantially constant in all stages; this private case produces a higher over-all efficiency than the efficiency obtained when all stages have exactly equal energy conversions and the above comparison is based when the energy conversion of each stage in the constant energy conversion machine is equal to the energy conversion of the most loaded stage in the constant Mach number machine;

(f) Making the energy conversion of all stages constant in the second version;

(g) Making the angle of stagger $\gamma$ increase as a function of the radius of the stage and making this angle either equal to 0°, or approaching 0°, in the first stage and making it reach larger values, such as 40°–60°, in the last rotor stage, the maximum value of this angle depending on the maximum radius of the machine, the number of stages and the rate of diffusion of the exit stator;

(h) Making the velocity coefficient $\varphi$ or $\psi$ increase as a direct function of the diameter of the stage.

What is stated in (a) also applies to the single rotation radial flow turbines and single rotation axial flow turbines except that while the Mach number of the energy conversion per stage remain constant in the single rotation machines, the kinetic energy and the momentum and the absolute velocity will fluctuate from rotor to stator, increasing in the stators, but the fluctuation is decreased (as much as 2 to 4 times by the way of illustration) from the present in the known single rotation radial and axial turbines. It is possible to eliminate this fluctuation altogether but this will increase the number of the stages and, therefore, in the single rotation machines, it does not represent the optimum operating conditions.

Therefore, in the axial flow machines disclosed here, energy conversions of all the rotatable stages are made substantially equal to the last rotatable stage or the exit Mach numbers are made equal by also using the principles outlined in the items *a, b, c, d,* and *h,* with the qualification that a mean diameter is considered in the axial flow case. As to *f,* it also applies to the axial flow machines; however, since in the super-pressure portion, the axial flow stages generally do not increase in diameter, the constant energy conversion is the only optimum method of energy conversion. In the variable radius lower pressure stages there is a greater choice of available energy conversions, such as constant energy conversion and a second method having a constant energy conversion in several upstream stages and then increasing energy conversions with the increase in the diameter of the downstream stages.

In the preferred version of the disclosed methods, high initial velocities high momentum and high rates of expansion are obtained in the turbines by introducing a stationary input stator stage in the radial flow machines (these stators are known in the axial flow machines) and expanding the working fluid at a high rate in the input stator for obtaining a high entry velocity high kinetic energy and high momentum at the entry into the first rotatable turbine stage. Therefore, the maximum change in the absolute velocity and the maximum temperature change, or the drop in temperature, takes place in the input stator where the mechanical stresses approach zero. Therefore, the stator can withstand higher temperature much better than the first rotatable stage which is now, in this arrangement, subjected to lower temperatures than the first rotatable stage of the centrifugal flow turbine having no input stator. Accordingly, the maximum temperature of the cycle can be made higher with the corresponding increase in the efficiency of the Joule's or Clasius-Rankine cycle. In this version of the machine, with the input stator, all rotatable stages can be made to have constant energy conversions, including the first rotatable stage. When there is no input stator in the radial machines, then the constant energy conversion begins only with the second stage when there is no high swirl velocity available at the entry into the first rotatable stage. However, the constant Mach number method of operation begins, even in this no input stator version, with the first stage.

In the axial flow machines, according to this method, normally, there always should be an input stator to obtain high entry velocity into the first rotatable turbine stage.

In the radial machines, there may be a high swirl velocity at the entry into the first stage and when such swirl velocity is available, and is sufficiently high, such as in rotatable combustion chamber gas turbine power plants, it is then possible to eliminate the input stator. However, the optimum results are obtained when there is an input stator in the axial and the radial flow turbines.

In the axial flow machines, it is also possible to eliminate a stator only if special means, such as rotatable combustion chamber or a scrolled input steam chest, are provided to produce a high swirl velocity. Since an input stator is much simpler and more efficient and can produce high exit velocities, it is the only practicable method.

It is important in radial and axial flow multi-stage machines to achieve as much energy conversion as possible with as few stages as possible. In the radial machines, the diameter of such machines is limited by some practical considerations and also by the fact that, in considering the over-all diameter of a machine, proper dimensional allowance should be made for structures permitting good flow-in or flow-out spaces at the entry and exit to and from the stages. Similarly, in the axial flow machines, the axial length should be as small as possible. The disclosed turbines are capable of producing higher shaft horsepower with a lesser number of stages, thus enhancing materially the performance characteristics of the radial flow, as well as of the axial flow, machines. The decrease in the number of stages may be as high as 40% to 50%. These percentages act as precise definitions of the words 'high" or "higher" when they are used in connection with the high momentum, high kinetic energy, high velocity, high energy conversion, etc.

As stated previously, the preferred version of tne invention uses an input stator and the turbine is a contra-rotating radial flow turbine. This is the preferred version because the total number of stages is reduced to an absolute minimum. However, the basic principles of this invention are also applicable to the single rotation machines with or without any input stator, although these versions are not as effective as the preferred version. As mentioned previously, the input stator is the best solution for imparting high velocity to the working fluid.

It is one of the objects of this invention to provide novel methods and apparatus relating to multi-stage centrifugal flow and axial flow turbines having higher energy conversion characteristics than the known multi-stage centrifugal flow and axial flow turbines; in one version and method all stages are made to have constant exit Mach number and in the second version and method all stages are made to have constant energy conversions.

An additional object of this invention is to provide novel radial centrifugal flow turbines having an input stator and two contra-rotatable rotors with inter leaving stages, one set of stages being supported either through the blading of the first or the last rotatable stage.

Yet another object of this invention is to provide centrifugal flow turbines having a stationary expansion input stator, two contra-rotatable rotors and a stationary diffusion discharge stator, the two rotors being mounted on two respective side-discs and on two concentric shafts in a cantilever manner, with the upstream portion of the stationary input duct being in line with such shafts and the downstream of the duct terminating at the input stator, the turbine rotor stages being positioned between and fluid dynamically directly coupled to the input expansion stator and a stationary output diffusion stator.

It is also an additional object of this invention to provide a centrifugal radial flow gas turbine having a stationary expansion air-cooled input stator at the entry into the turbine and an air-cooled rotatable first turbine stage which follows the input stator.

It is also an object of this invention to provide a novel method of converting a high potential energy of a working fluid into mechanical work by converting a portion of this potential energy into kinetic energy at the entry into a turbine, and maintaining this kinetic energy, the exit Mach number, or the energy conversion per stage, the absolute momentum and the absolute entry velocity substantially constant throughout the turbine and at a continuous and constant level which is higher than those used in known contra-rotatable turbines.

It is also an object of this invention to maintain the Mach number or the energy conversion constant in the single rotation turbines and reducing several fold the fluctuations in the remaining energy parameters, such as absolute and relative velocities, kinetic energy and momentums, as compared to the fluctuations of these energy parameters in the prior art single rotation machines.

It is an additional object of this invention to provide a novel method for operating high pressure axial flow turbine stages so that the optimum mode of operation takes place when there is a constant Mach number of a constant energy conversion at a much higher level than in the known methods, with the relative entry and absolute exit velocities having substantially constant magnitudes in all stators, then also constant in all rotors and stators in single rotation machines and in all rotors in contra-rotating machines.

Among the additional objects of this invention is the provision of a multi-stage centrifugal radial flow turbine and the methods of its operation having substantially constant energy conversion in one version and constant exit Mach number in the second version, such energy conversions in both versions being obtained by making the total turning angle, $\theta$, and the leaving absolute velocity all inversely proportional and the rate of expansion directly proportional to the diameter of the stages.

The novel features which are believed to be characteristic of the invention, both as to their organization and method of operation, together with further objects and advantages thereof, will be better understood from the following description considered in connection with the accompanying drawings in which several embodiments of the invention are illustrated by way of several examples. It is to be expressly understood, however, that the drawings are for the purpose of illustration only and are not intended as a definition of the limits of the invention.

Referring to the accompanying drawings,

FIGS. 1, 3, 5, 8, 9, and 18 are longitudinal sectional views of the centrifugal flow turbines;

FIGS. 2, 6, 12, and 16 are transverse sectional views of the turbines illustrated in FIGS. 1, 3, 5, 8, 9, and 18, respectively, the location of the sectional view being illustrated in FIG. 1 by line 2—2 and in FIG. 5 by line 6—6. In these figures the steam bleeding is omitted.

Figures 17, 18:
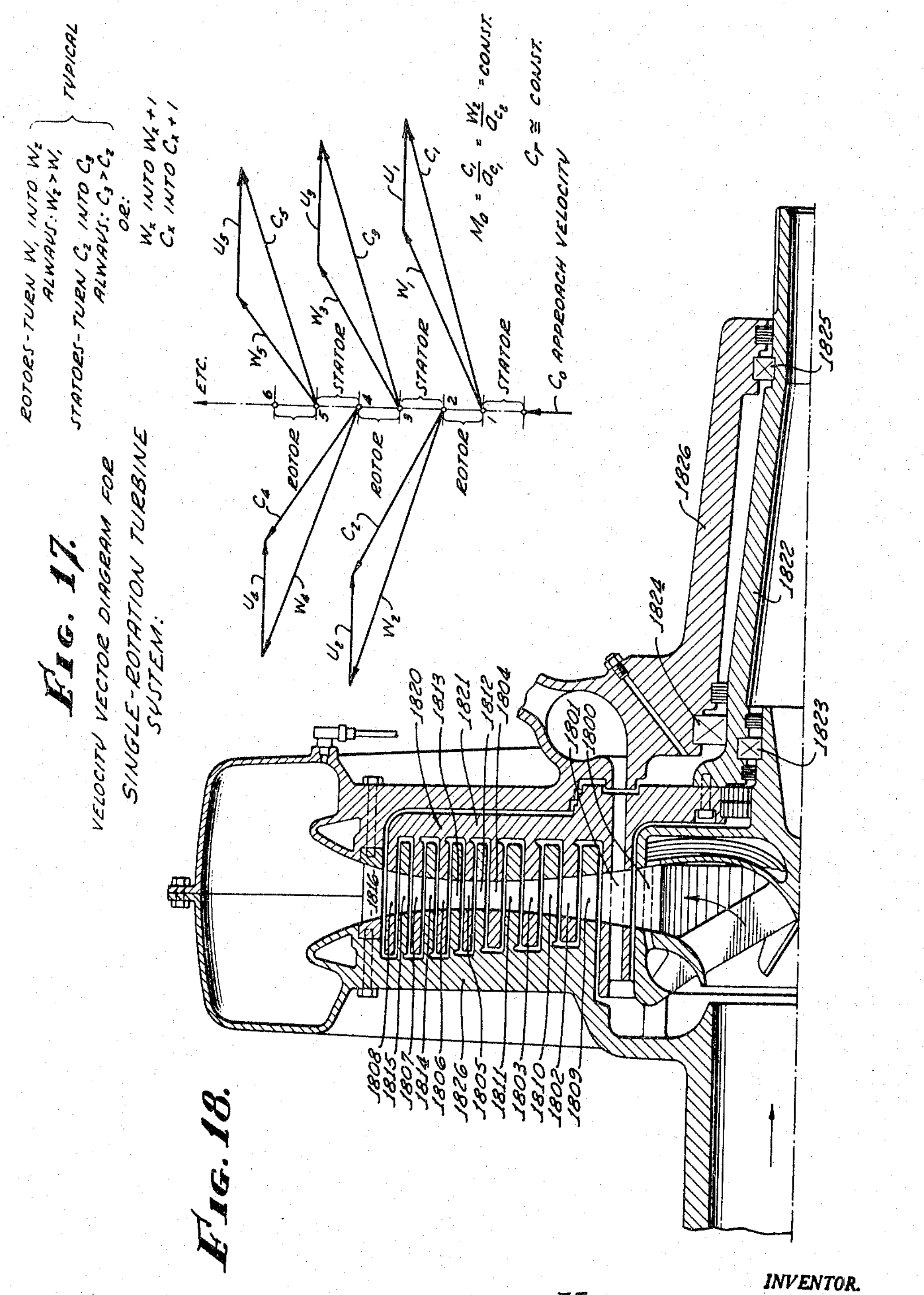

FIGS. 10, 11, 14, 15, and 17 are velocity vector diagrams for the centrifugal flow turbines disclosing the operation of the turbine at constant exit Mach number (FIG. 10), constant energy conversion per stage (FIG. 11), without input stator (FIGS. 14 and 15) and when the turbine is a single rotation tubine (FIG. 17).

Figures 7, 13, 22, 38:
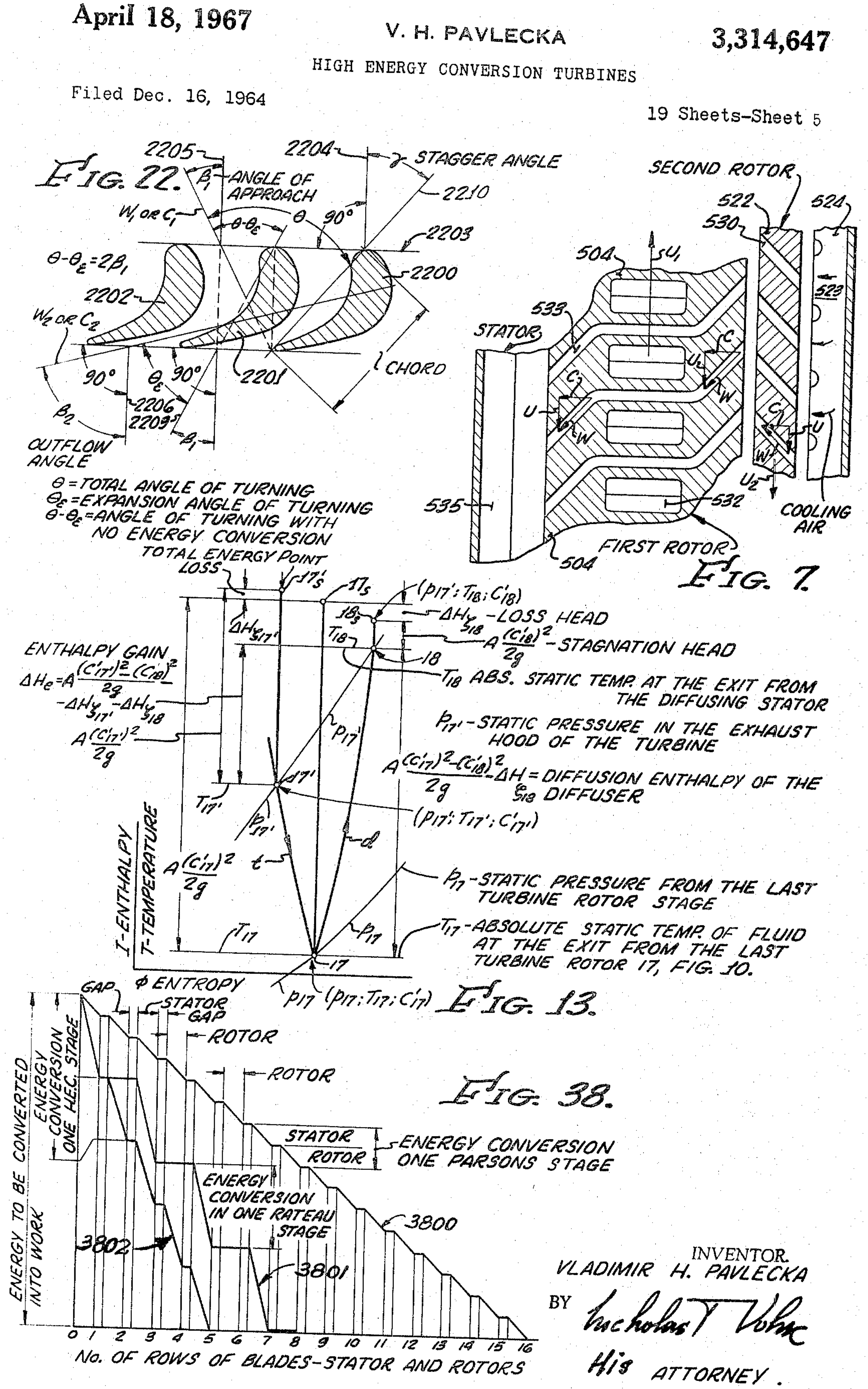
FIG. 7 is the sectional view of the fluid-cooled turbine stage taken along line 7—7 illustrated in FIG. 5.

FIG. 13 is the enthalpy-entropy diagram for the diffusion stator of the disclosed turbines.

Figure 19:
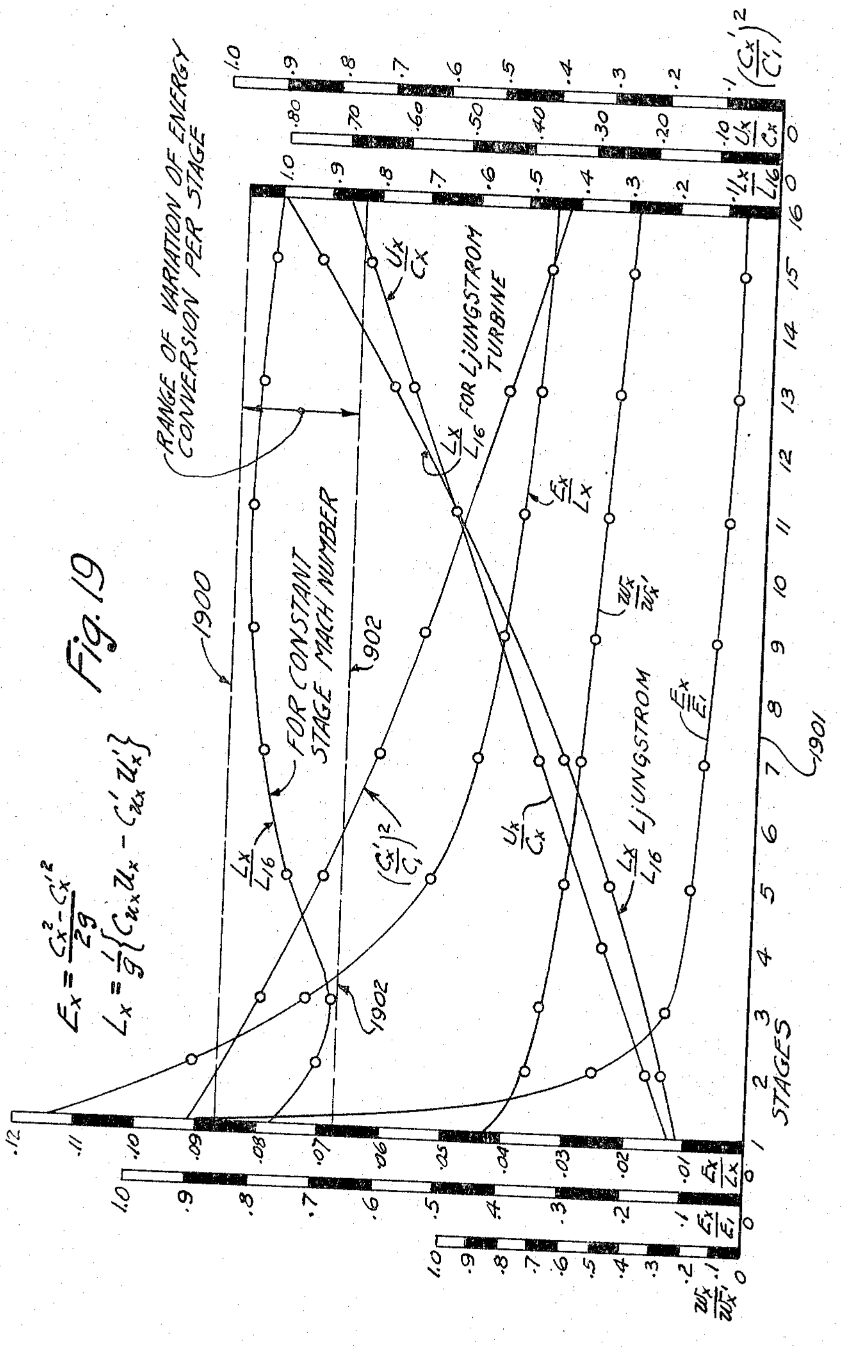

FIG. 19 is a series of performance curves for the centrifugal flow contra-rotatable turbine.

Figure 20:
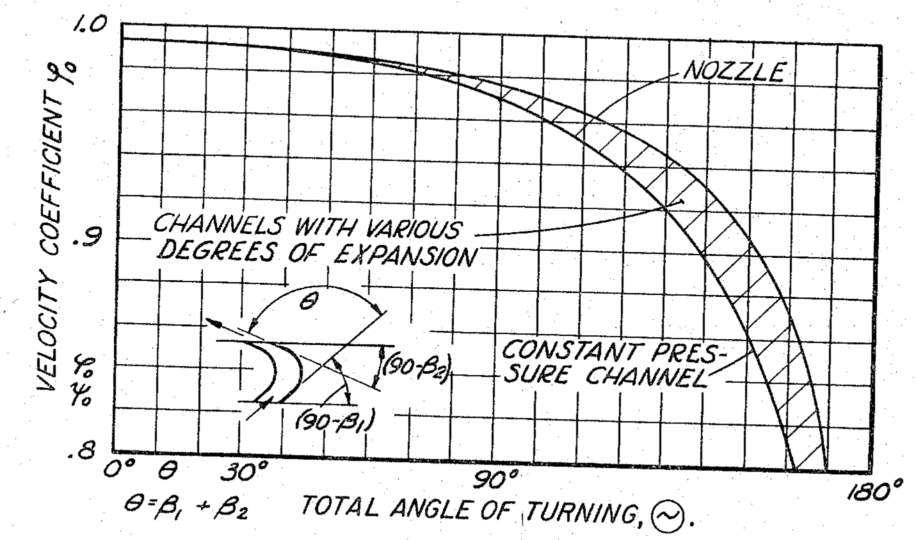

FIG. 20 is a chart of velocity coefficient plotted against total turning angle.

Figure 21:
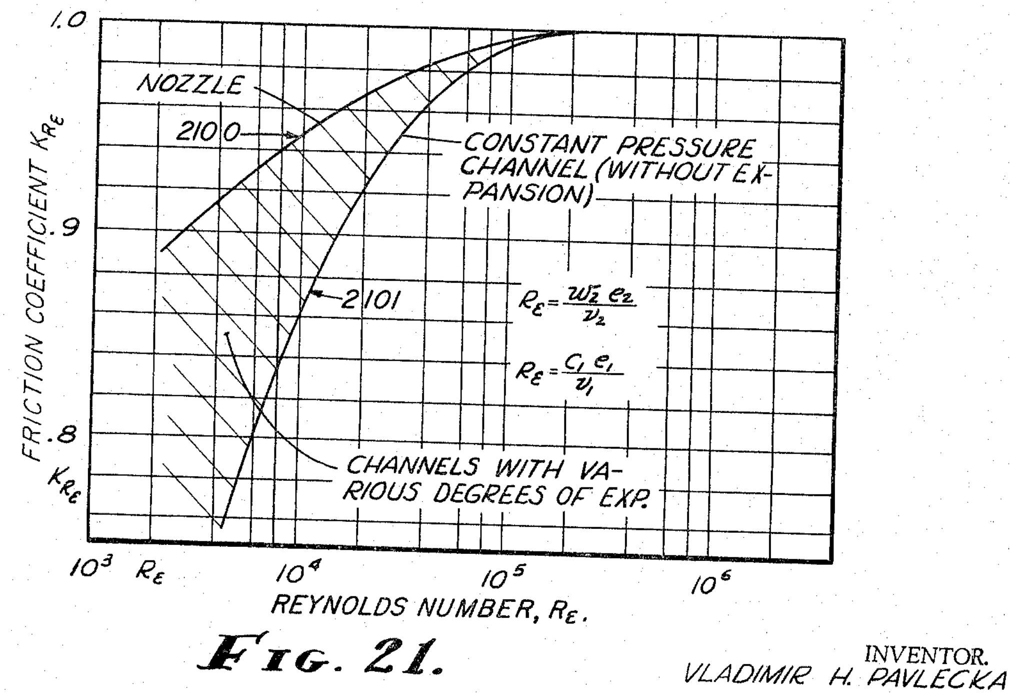

FIG. 21 is a chart of a friction coefficient plotted against Reynolds' number.

FIG. 22 illustrates the blade and stage angles used in the description of this invention.

Figure 23:
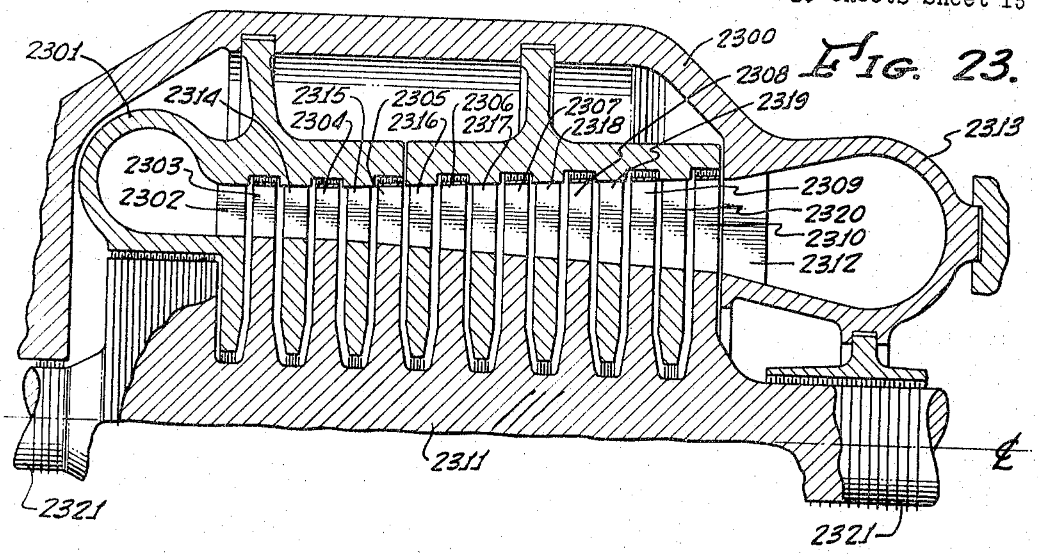

FIG. 23 is an axial section of an upper half of a pressure cylinder of a single rotation axial flow constant mean diameter steam turbine for expanding steam from superpressures to medium pressures for obtaining constant energy conversion per stage from the first rotor stage to the last rotor stage.

Figure 24:
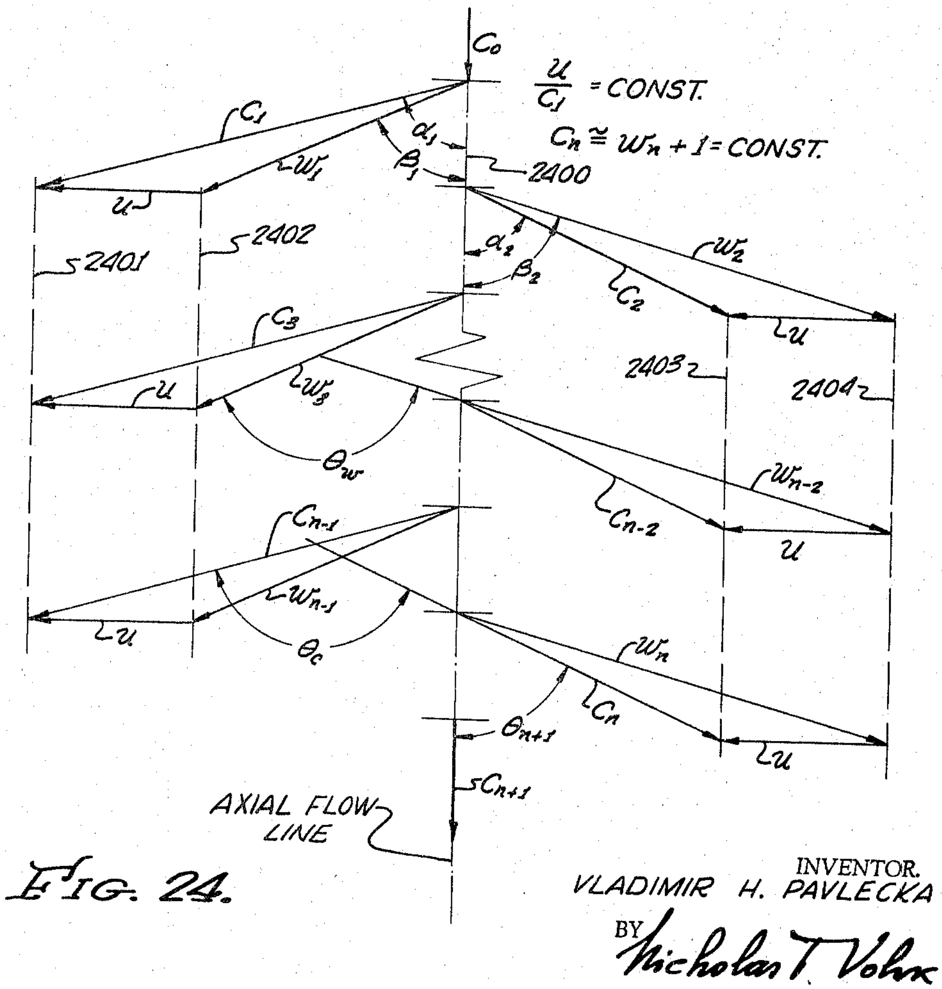

FIG. 24 is a velocity vector diagram for the turbine illustrated in FIG. 23.

Figures 25, 26:
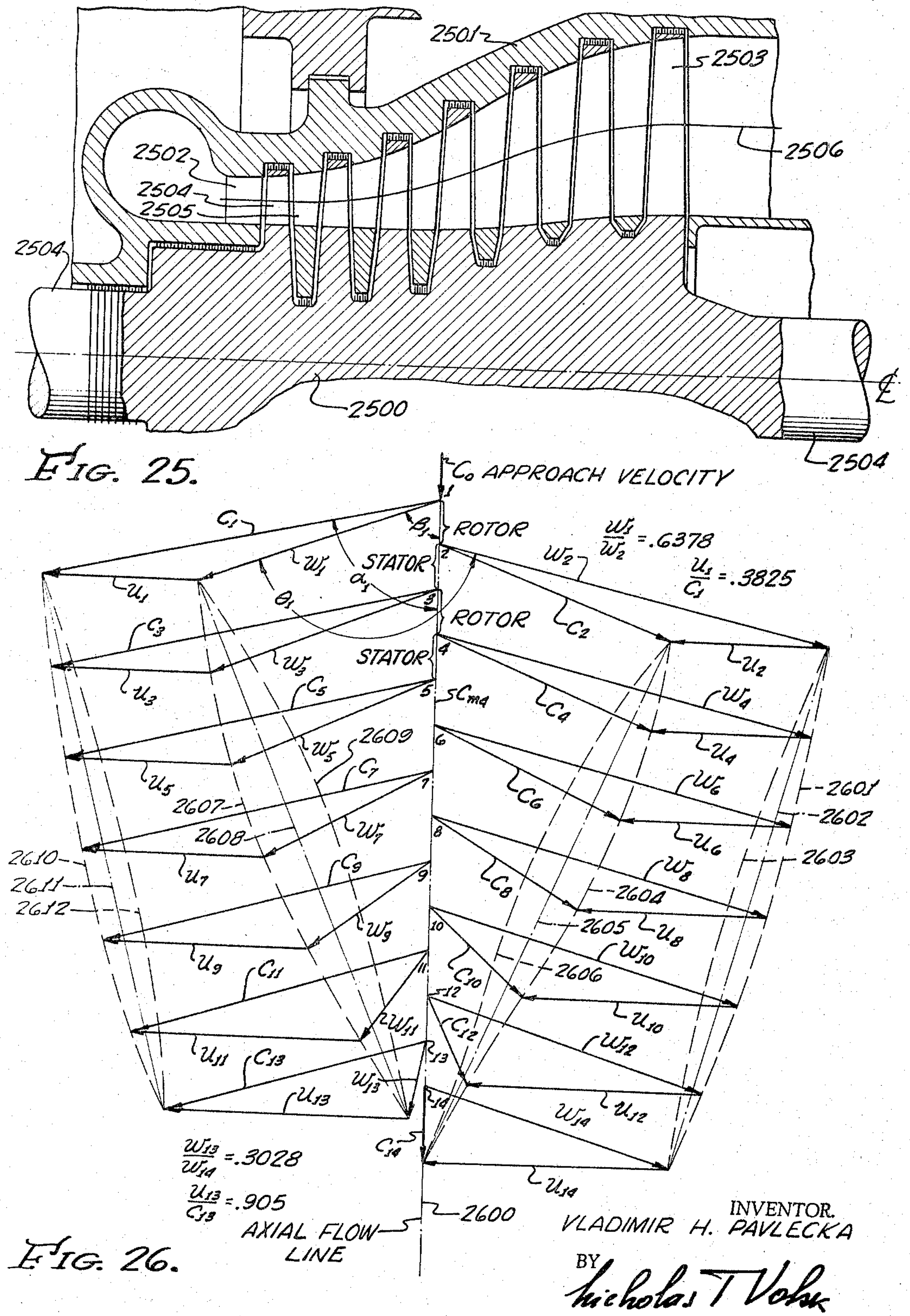

FIG. 25 is an axial section of a single rotation axial flow turbine with an increasing diameter in the lower pressure stages, the turbine being suitable for expansion of any working fluid from a medium pressure to the lowest pressure.

FIG. 26 is the velocity vector diagram for the turbine shown in FIG. 25.

Figures 27, 28, 29:
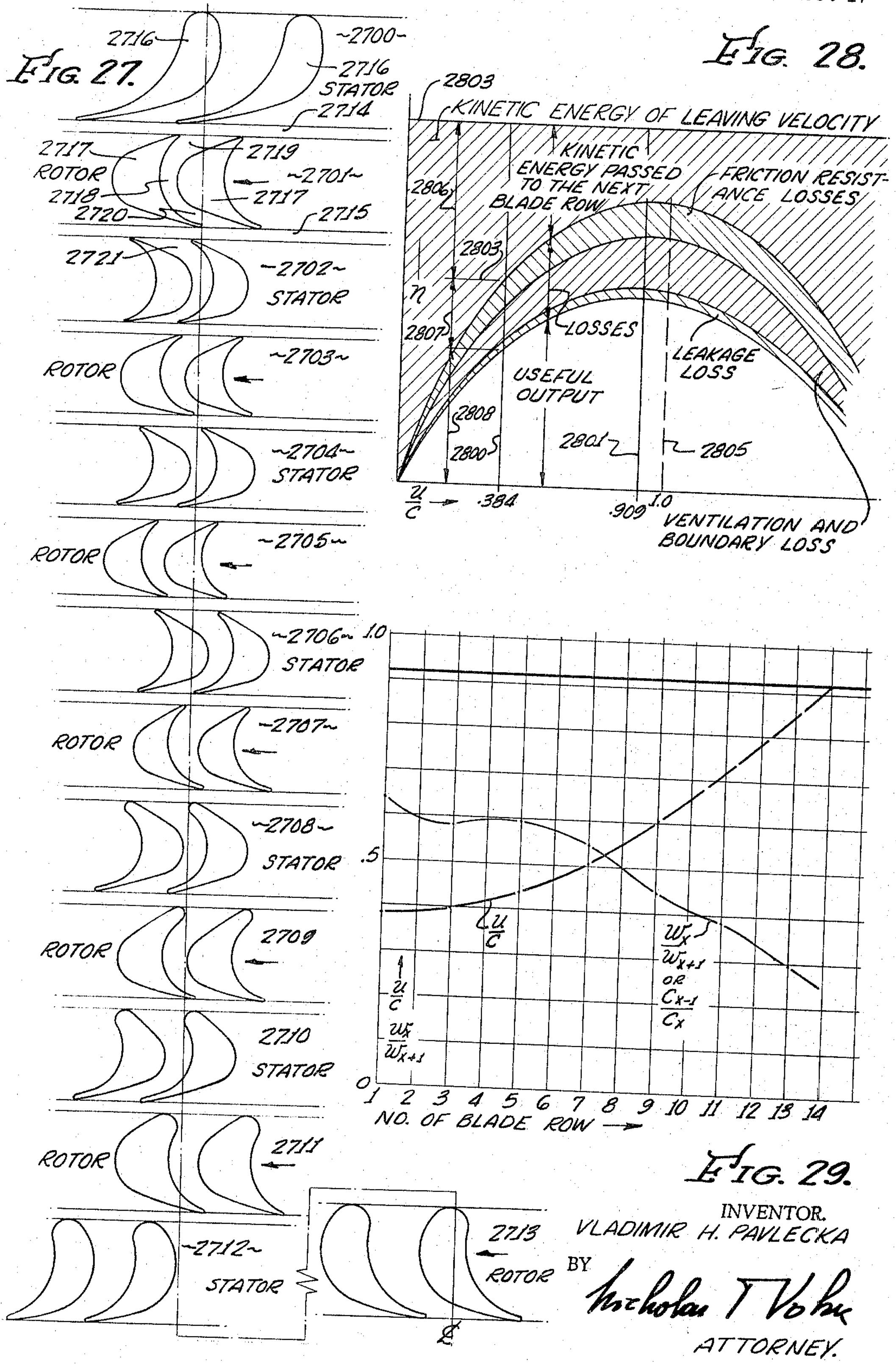

FIG. 27 is a mean diameter cross-section of blading for the turbine illustrated in FIG. 25.

FIG. 28 is a chart illustrating all loss components present in axial flow impulse turbines of the prior art.

FIG. 29 is a chart of velocity ratios for the disclosed machines as well as for the prior art machines.

Figure 30:
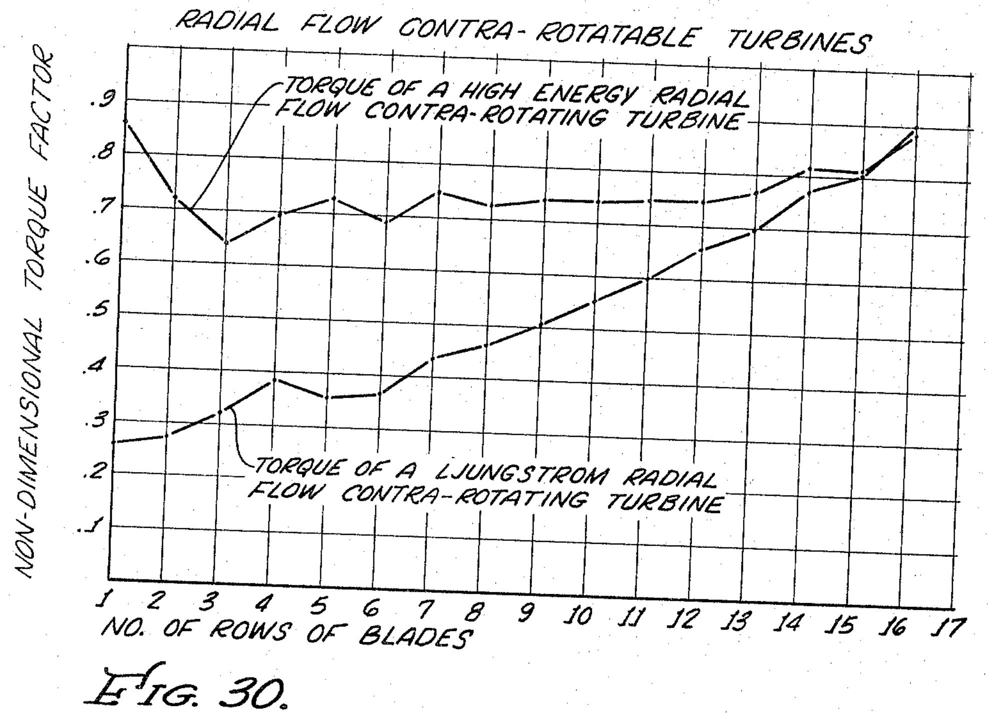

FIG. 30 is a torque curve for radial centrifugal flow turbines.

Figure 31:
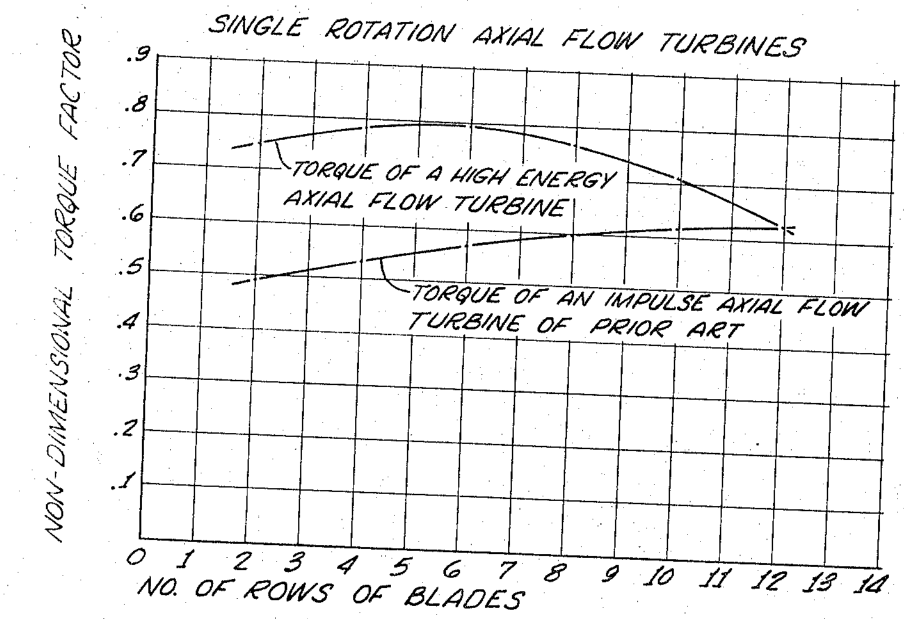

FIG. 31 is a torque curve for axial flow turbines.

Figures 32, 33, 34, 35, 36, 37:
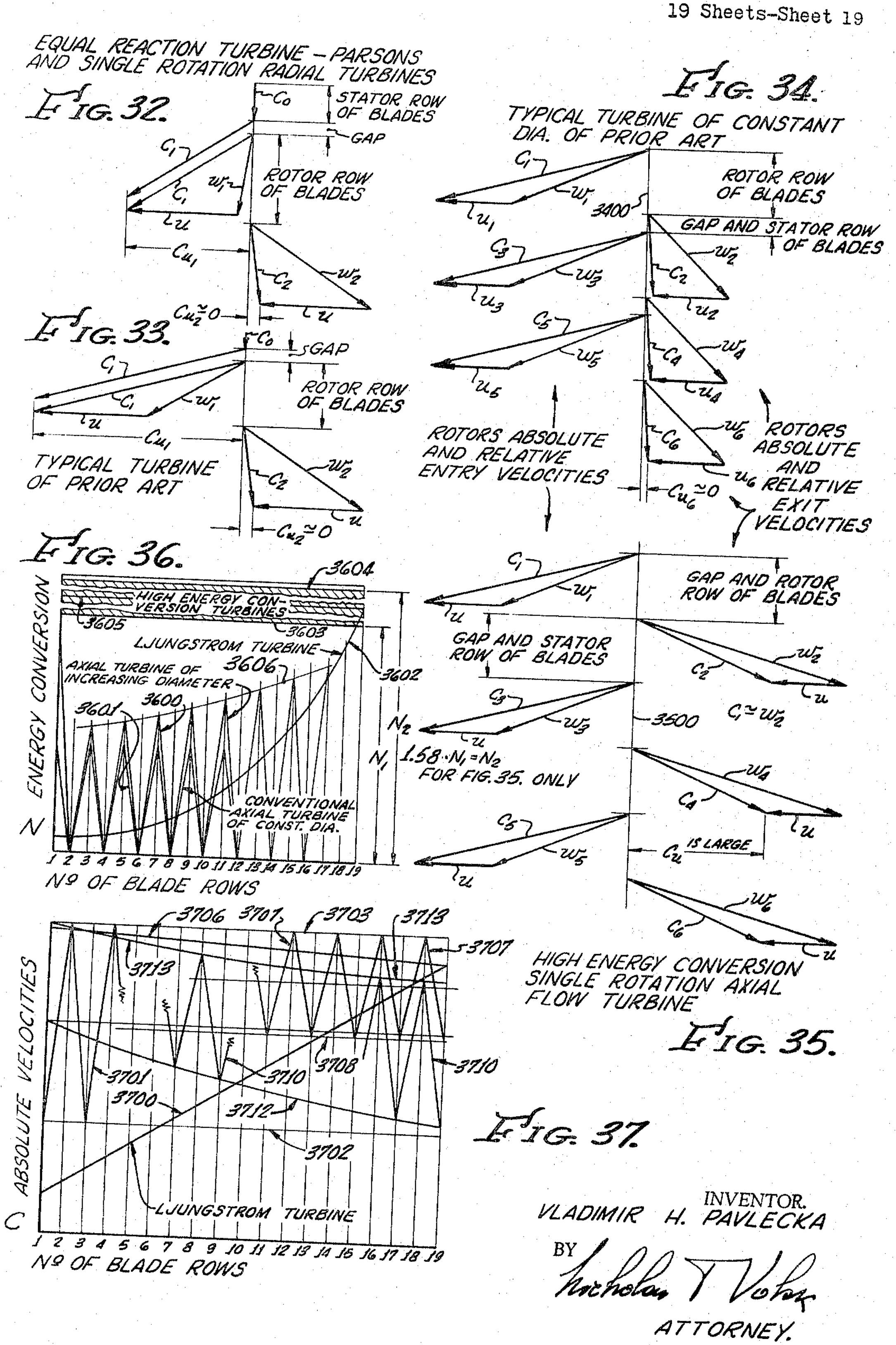

FIG. 32 is a vector diagram for a single stage of a Parsons or Ljungstrom turbine;

FIG. 33 is a vector diagram for an axial flow impulse turbine of the Rateau type;

FIG. 34 is a vector diagram for a known single rotation constant mean diameter axial flow turbine having constant energy conversion per stage while FIG. 35 is a vector diagram for the same machine but operated in accordance with the new, disclosed method;

FIG. 36 is an energy conversion chart for the turbines illustrated in FIGS. 32–35;

FIG. 37 is an absolute velocity chart for the turbines illustrated in FIGS. 32–35;

FIG. 38 is an explanatory figure illustrating the total number of stages required to convert a given total energy of the working fluid into mechanical work by the axial flow Parsons turbine, the axial flow Rateau turbine and the high energy conversion axial flow turbines, all turbines being a single rotation turbines.

*General principles underlying this invention*

Before proceeding with the description of specific turbines, it should be helpful to describe the basic principles relating to the disclosed methods and how these methods differentiate from the known methods.

FIG. 32 in a typical, known vector diagram for a "single stage" of a single rotation axial flow turbine of the Parsons type or single rotation radial flow turbine in which case the "single stage" means one rotor stage and one stator stage. Fluid enters the turbine input stator at a radial or an axial velocity $C_0$ and leaves the stator at an absolute velocity $C_1$. It leaves the first rotor stage at an absolute velocity $C_2$ and a relative velocity $W_2$. $C_{U2}$ approaches zero and therefore, the energy conversion component of the absolute velocity, or the tangential component, approaches zero. Therefore, the energy conversion curve for the axial flow machines of variable diameter is of the type illustrated in FIG. 36 at 3600. The amplitude of this curve increases with the increase of the diameter of the stages. The triangles in FIG. 32 also increase (not illustrated) from the first stage to the last stage, all the triangles being congruent triangles of increasing sizes.

These diagrams also apply to the single rotation radial centrifugal flow turbines of the prior art, such as the Ljungstrom turbines.

FIG. 33 is a vector diagram for a well known axial impulse turbine known as the Rateau turbine. The only difference between FIGS. 32 and 33 is that $C_{U_1}$ in FIG. 33 is approximately twice as large as in FIG. 32. In both cases $C_{U_2}$ approaches zero, i.e. the working fluid is returned to the same radial vector approaching $C_0$. In FIG. 36 curve 3600 applies to FIG. 33 as well as FIG. 32 except its amplitude is larger.

FIG. 34 is a vector diagram for a known constant mean diameter, single rotation, axial flow turbine having constant energy conversion per stage. As in the case of FIGS. 32 and 33, $C_{u_1}$, $C_{u_4}$ and $C_{u_6}$ approach zero. The curve 3601, FIG. 36 corresponds to FIG. 34. It is a zig-zag curve having a constant amplitude.

FIG. 35 is a vector diagram for a constant mean diameter, single rotation axial flow turbine having the same mean stage diameter as the turbine in FIG. 34 but constant energy conversion per stage in accordance with the disclosed method. Therefore, FIG. 34 illustrates prior art, while FIG. 35 illustrates the new method where energy conversion is accomplished at a high rate, at a higher level and a constant rate in all stages. The turbines in FIGS. 34 and 35 have the same diameter to illustrate as accurately as possible the difference between the prior art and the new methods. Comparison of FIGS. 34 and 35 indicates that the absolute entry velocities into the rotors, $C_1, C_3, C_5 \ldots C_n$ are practically constant and are identical in both figures. However, the relative and absolute exit velocity triangles, which are to the right from lines 3400 and 3500 in FIGS. 34 and 35, are radically different and their relationships with respect to the lines 3400 and 3500 are different. No stators are illustrated in FIGS. 34 and 35, according to convention. In FIG. 34, the $C_u$ vectors approach zero which means that fluid enters stators and leaves rotors with the least possible kinetic energy consistent with the angles of the velocity vector triangles. In FIG. 35, on the other hand, the absolute entry velocities into the rotors are equal, or nearly equal, to the relative exit velocities from the rotors, both velocities ($C_1=W_2$; $C_3=W_4 \ldots$ etc.) being large velocities. Also, while in FIG. 35 $C_{u_j}$ is approaching or is equal to zero, in FIG. 35 $C_{u_j}$ has a high value, greater than U, which is the mean peripheral velocity of the stage. The meaning of the above is that the energy conversion per rotor-stator combination in FIG. 35 is approximately from 1.4 to 5 times larger than in FIG. 34 for the illustrated cases where the mean diameter of the stages is identical. This means that the turbine in FIG. 35 will convert the same amount of energy into shaft power with approximately 40%–50% fewer stages than the turbine in FIG. 34.

In FIG. 35 the relative and the absolute Mach numbers may be made to remain substantially constant, which would mean that the profiles of the blades in the stators and rotors at any radial station would be the same thus decreasing the cost of the turbine. The turbine of FIG. 35 can also be designed to have constant Mach number per stage.

There will be absolute and relative velocity, total kinetic energy and absolute momentum fluctuations from rotor to stator, but not from stator-to-stator or rotor-to-rotor in the vector diagram in FIG. 35 and in FIG. 34. However, these fluctuations are approximately half of the similar fluctuations in FIG. 34.

The absolute velocity fluctuations are illustrated in FIG. 37. Curve 3700 is for the Ljungstrom turbine, curve 3701 is for the turbine of FIG. 34. In curve 3701 the absolute velocity fluctuates between line 3702 and 3703. Curve 3707, which corresponds to the turbine of FIG. 35, fluctuates between lines 3708 and 3703. When the turbine of FIG. 35 is a variable, or increasing diameter turbine, then the velocity fluctuations are of the type illustrated by a curve 3710 which is subtended by lines 3712 and 3713. When the turbine is a contra-rotative turbine, then the absolute velocity locus becomes a substantially straight line 3706 which is almost parallel to the abscissa.

FIG. 36 illustrates the energy conversion per stage obtained with the machines illustrated in FIGS. 32 through 35. Curve 3601 is for an axial flow turbine illustrated in FIG. 34. Curve 3600 is for an axial flow turbine illustrated in FIGS. 32 and 33 with the assumption that the diameter of the turbine stages increases. Curve 3600 also applies to a single rotation radial flow turbine except that the variations in the maximum amplitudes of the curve, as defined by a line 3606, should be much smaller for the upstream stages and larger for the downstream stages. The conventional Ljungstrom turbine curve is illustrated at 3602 and, therefore, the single rotation curve should be plotted between curve 3602 and the abscissa rather than curve 3606 and the abscissa.

Figure 10:
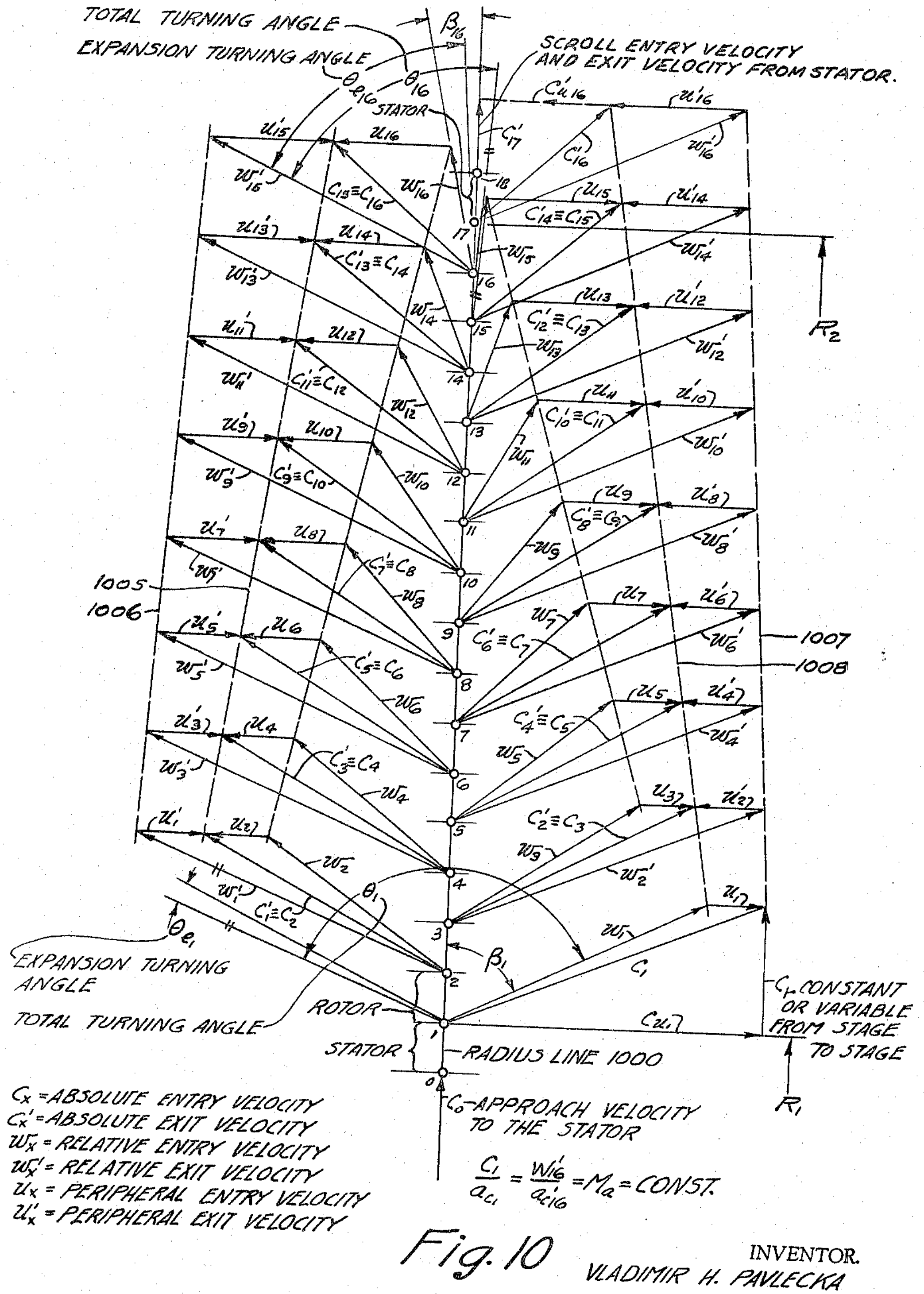

The high energy conversion turbines disclosed here are illustrated by a shaded area lying between lines 3604 and 3603, with the mean line being a line 3605. When the turbine is a contra-rotating centrifugal flow turbine, the locus will be a straight line lying anywhere between the lines 3606 and 3604, and line 3604 may have even a greater ordinate than the one used in FIG. 36. This is so because the lines 3604 and 3605 were drawn for FIG. 35, which is a single rotation machine. Stated differently, the two contra-rotating rotors, the vector diagram for which is illustrated in FIG. 10, are more powerful than the single rotor diagram illustrated in FIG. 35. Hence, the overwhelming advantage of contra-rotation which cannot be achieved in axial machines for structural reasons. When the turbine is a single rotation axial or radial flow turbine, such as that illustrated in FIG. 35, then the energy conversion, as stated previously, will be constant, or nearly constant, in the stators at one level represented by line 3604 in FIG. 36. It also will be constant, or nearly constant, in the rotors but at a lower level represented by line 3603. For example, if $N_1$ is the energy conversion in the rotor and $N_2$ in the stator, then the relationship between $N_1$ and $N_2$ in FIG. 35 is in the order of 1.6 $N_1=N_2$, which means that there is a greater energy conversion in the stators by approximately 35%. In FIG. 34, $N_1$ is the only energy conversion since $N_2=0$, which is also shown in FIGS. 35 and 36. The above discussion indicates that there is a radical difference in the energy conversion rates between FIGS. 32, 33 and 34, which is a prior art, and that illustrated in FIG. 35 and there is even a greater difference between the prior art and FIG. 10, which represents a vector velocity diagram for the contra-rotating radial centrifugal flow turbines, this case being illustrated in FIG. 36 by line 3605 and line 3706 in FIG. 37. It also follows that the optimum machine is a contra-rotatable radial centrifugal flow turbine.

The high energy conversion and the reduction in the required number of stages is also illustrated graphically in FIG. 38 where curve 3800 is for the Parsons turbine, curve 3801 is for the Rateau turbine and curve 3802 is for the high energy conversion single rotation turbine of the axial flow type.

FIG. 38 illustrates the comparative energy conversions of the two prior art turbines and of the high energy conversion turbine. The comparisons are based on three turbines having equal speeds of rotation and constant stage diameters. It is seen that the Parsons turbine would take eight stages (stator-rotor) (16 rows of blades) to convert the given amount of energy into shaft power. The Rateau turbine would take, in the most favorable case, four stages. The high energy conversion turbine would take only five rows of blades; this demonstrated the conversion capability of the high energy conversion turbines which would be of significant advantage even if it were done at somewhat reduced thermodynamic efficiency of the conversion itself, because the decreased efficiency could be sufficiently compensated for by the decreased friction losses due to reduced flow areas, etc.

The significant aspect of the high energy conversion turbines is that the increased energy conversion is achieved at increased direct conversion efficiency. This can be documented from the latest (2nd) edition of Prof. W. Traupel's book: "Thermische Turbomaschinen," 1966, J. Springer, Berlin, W. Germany. On page 368, of this book is shown a design diagram for determination of turning losses, FIG. 8. 4. 6., in which the loss function F, is plotted against the parameters $c_1/c_2$ and the total turning angle $\theta$. If specific comparative values are used with the aid of the above diagram, it results for instance, in one case of energy conversion three (3) times greater in the high energy conversion turbine, with the energy conversion losses being only 2.62 times greater with respect to the Parsons type of turbine. Similar comparison can be made for other parameters and it can be demonstrated for all high energy conversion turbines that their losses are lower in relation to their higher energy conversion. This, and many other comparisons, confirm, on the basis of the already existing data, that the high energy conversion turbines will not only be mechanically simpler, but at the same time, they also, will be the most efficient, in the centrifugal as well as in the axial flow systems.

The radial centrifugal flow turbines will be discussed first and discussion of the axial flow turbines will follow at the end of this specification.

*Radial centrifugal flow turbines*

The radial centrifugal flow turbines may be either contra-rotatable or single rotation turbines. Contra-rotatable machines have greater and wider utility because they can be used with the contra-rotatable centripetal flow compressors which produce the same pressure heads with approximately one-half of the stages and, therefore, are more desirable than the single rotation centripetal compressors.

In view of the greater importance of the contra-rotatable machines, they will be discussed first and the single rotation machines will be discussed at the end of the radial flow machines part of the specification.

The basic structure of the centripetal flow compressors and centrifugal flow turbines utilizes two contra-rotatable rotors mounted on two concentric shafts positioned to one side of the two rotors. A central stationary duct terminates in an acceleration or expansion centrifugal flow stator which conveys the working fluid directly to the contro-rotatable stages of the turbine. The two shafts, preferably, are interconnected by means of appropriate gears, such as herringbone gears, for proper synchronization of the two rotors. The central duct and the two concentric shafts have a common longitudinal axis. The duct extends to one side of the turbine, while the two shafts extend to the other side of the turbine. The two rotors are provided with appropriate means for fluid dynamically balancing each rotor so that equal fluid pressures are exerted by the fluid on the inner and the outer sides, or surfaces, of each rotor. Accordingly, the two rotors do not produce, or exert, any side thrust which is so wasteful of useful power appearing at the output shaft of the turbine.

In the preferred version of the radial centrifugal flow turbines, the turbines have input and output stator stages for improving their efficiency and no stators in another version which is less efficient but eliminates two stators at the expense of efficiency.

Before describing the structures, it may be helpful to point out the differences in the methods of operation of the known centrifugal flow turbines and the methods disclosed here.

In the prior art, i.e. the centrifugal radial flow contra-rotating turbines of the Ljungstrom type, the expansion has been always pro-rated to the ability of the stages to convert the kinetic energy into mechanical work, the velocity triangles of such stages being congruent triangles from the first to the last stage. Therefore, according to the known method, the energy conversion increases and the Mach number increases from the first stage to the last stage, which requires a large number of stages and low energy conversions in the inner and middle stages.

Thus, prior art failed to recognize constant energy conversion per stage by developing high kinetic energy either in the input stator (the preferred version), in the scroll (high swirl entry velocity) or in the first rotatable stage and then transmitting the high kinetic energizes to the outer stages, which are the methods disclosed here. With the methods disclosed here, the velocity triangles vary from stage to stage due to the fact that the working fluid is expanded very rapidly in the inner stator stage, in the stator version of the method, with the result that the absolute entry velocity $C_1$ of the fluid at the entry into the first turbine stage, is the highest absolute velocity in the entire vector diagram of the turbine.

As the diameter of the turbine stages increases, the velocity triangles gradually begin to approach the classical 50—50 reaction type triangles toward the last engine. The flow channels are thus proportioned to produce either a constant energy conversion per stage or a constant exit Mach number operation.

The same principles also apply to the high swirl entry velocity method and rapid expansion of working fluid in the first stage when there is no input stator.

Figure 1:
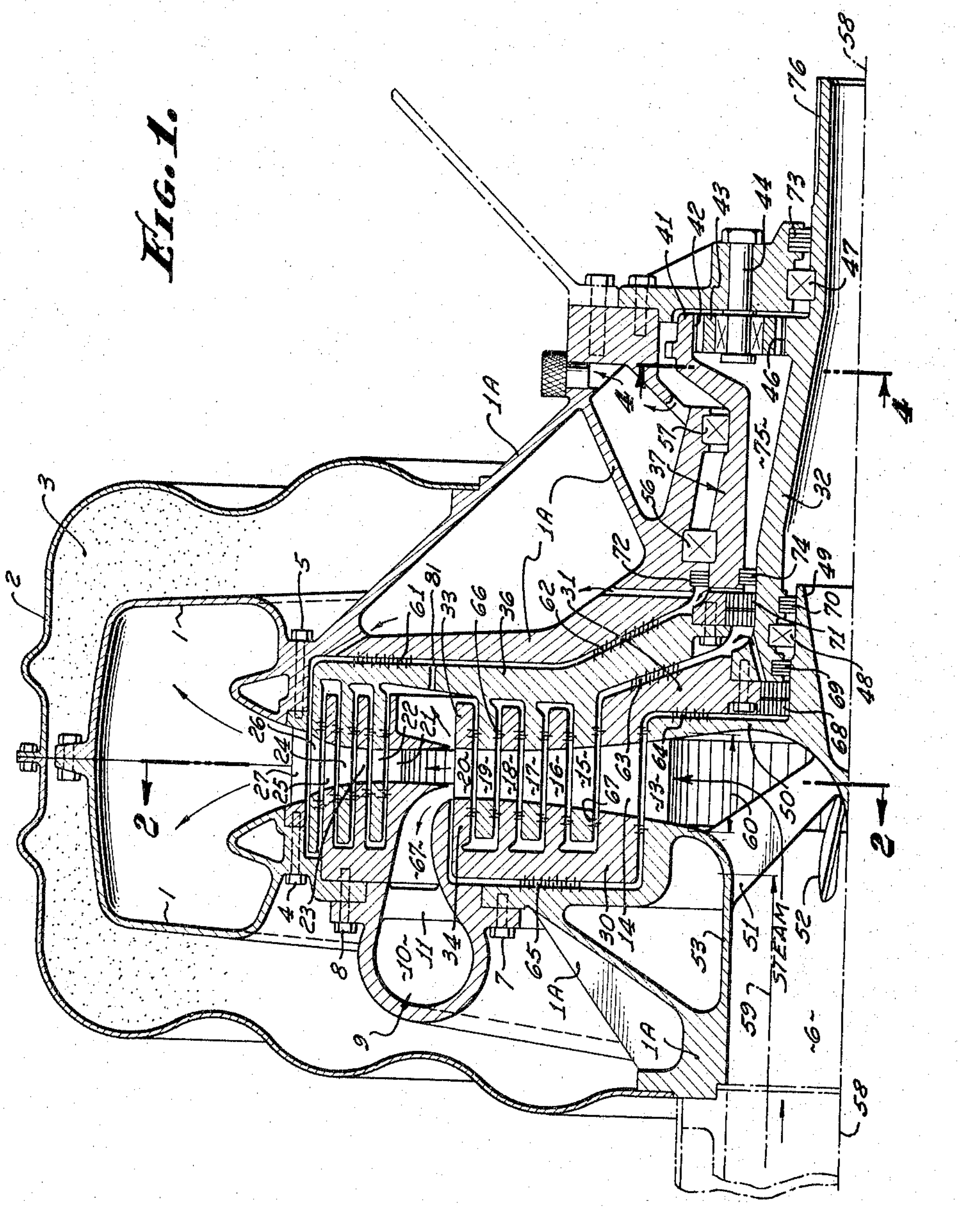
Figures 2, 6:
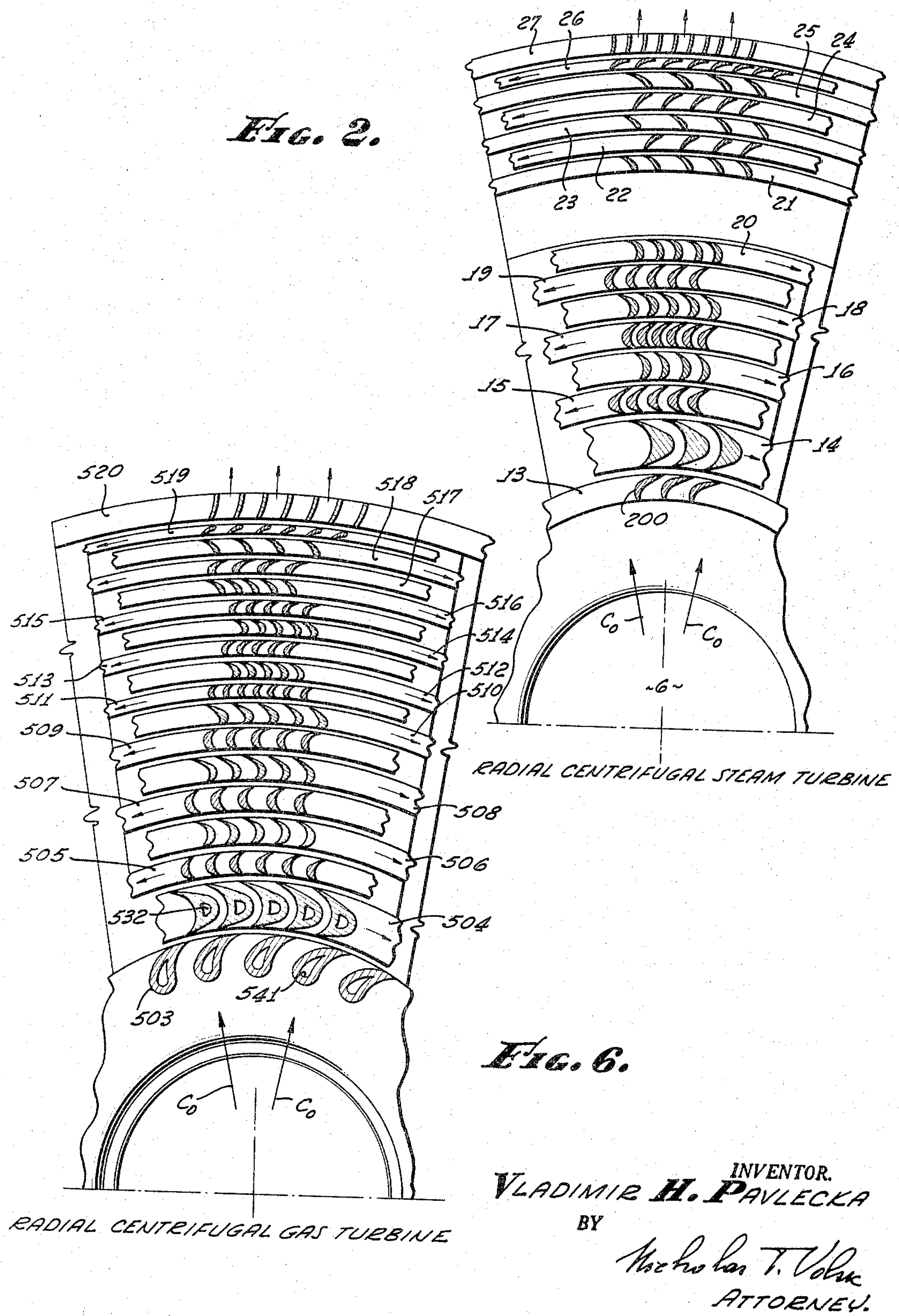
Figures 3, 4:
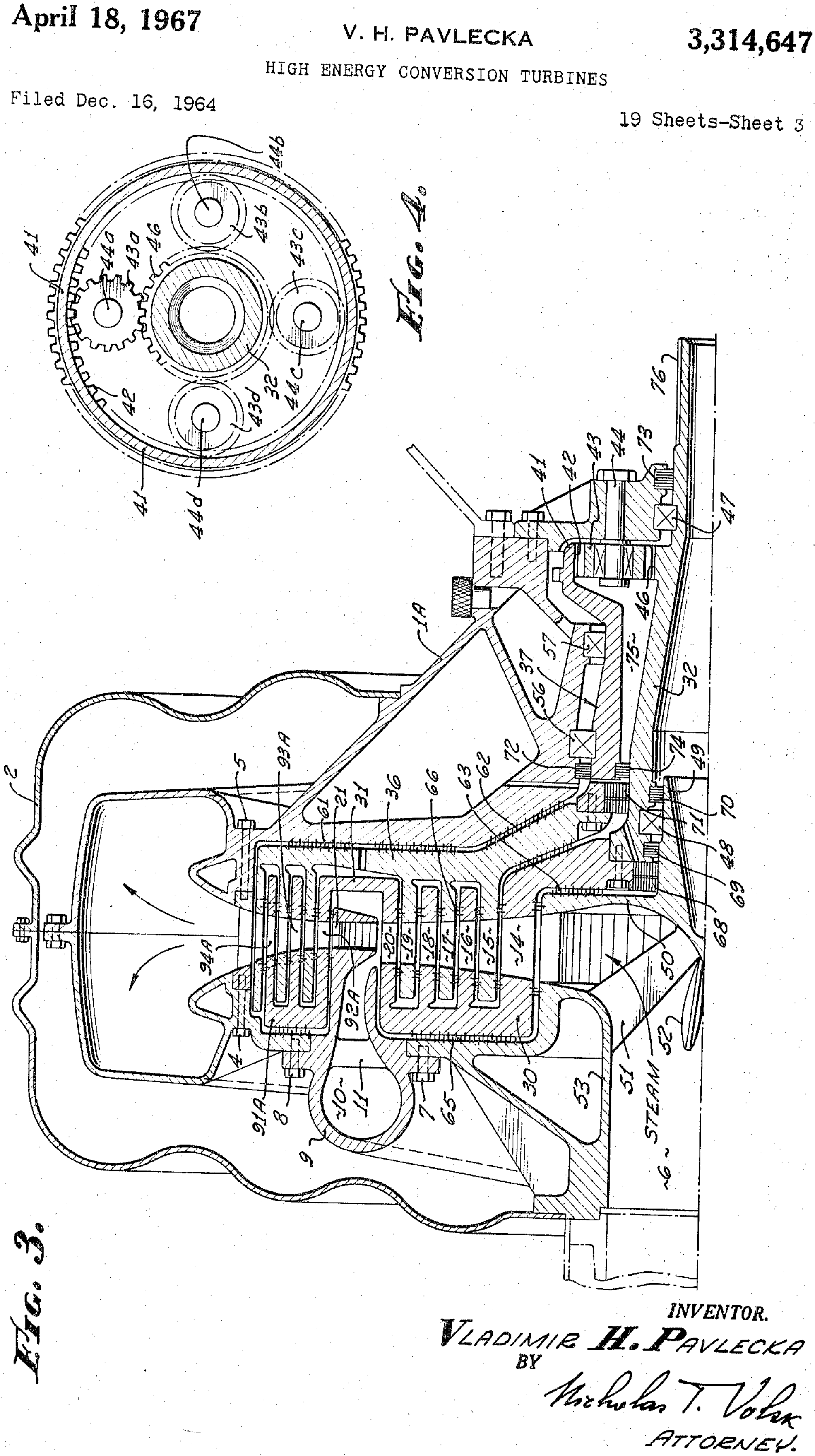
FIG. 4 is a transverse vertical section of a gear system illustrated in FIGS. 1, 3, 5, and 8.
Figure 5:
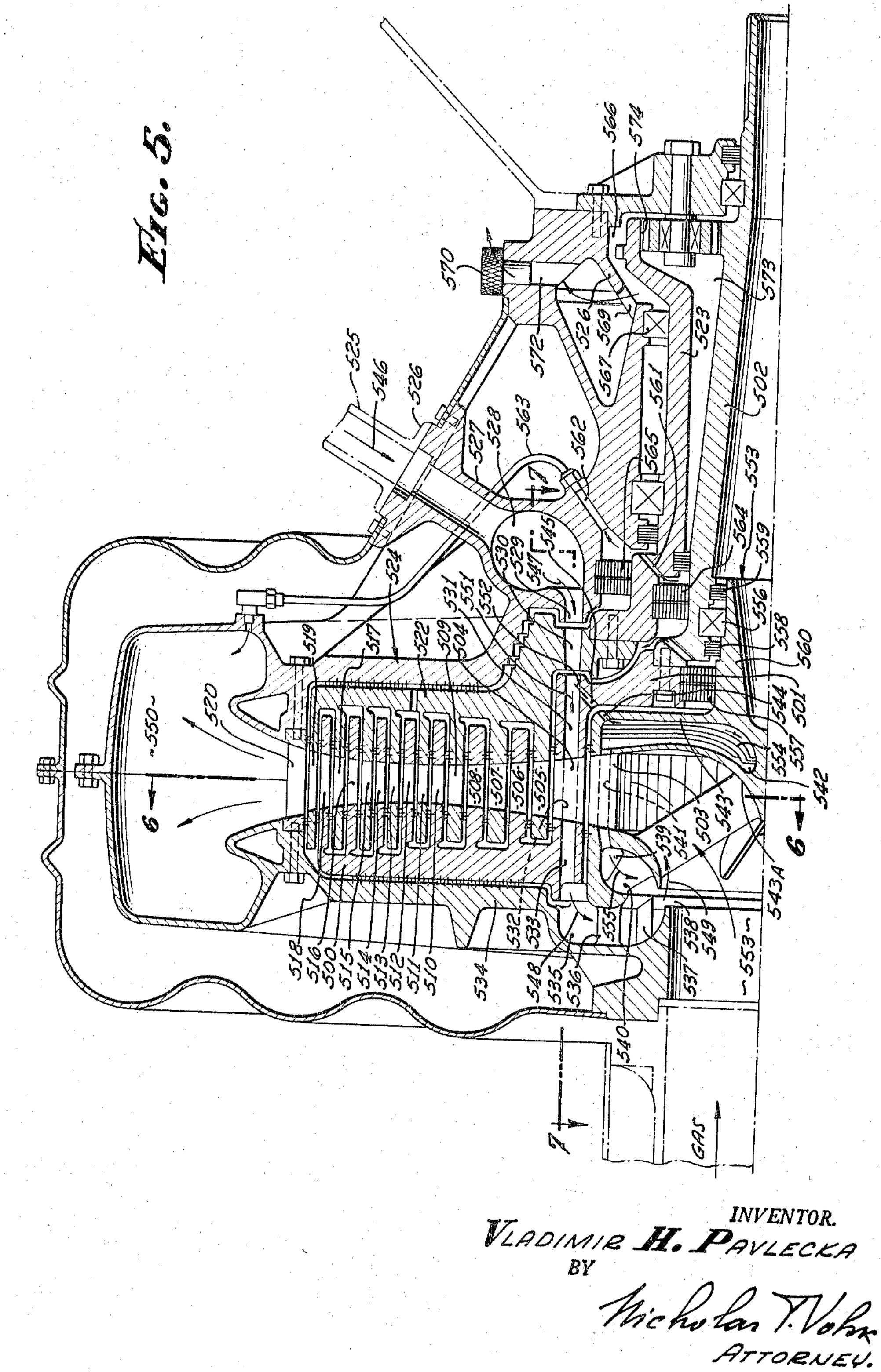
Figure 8:
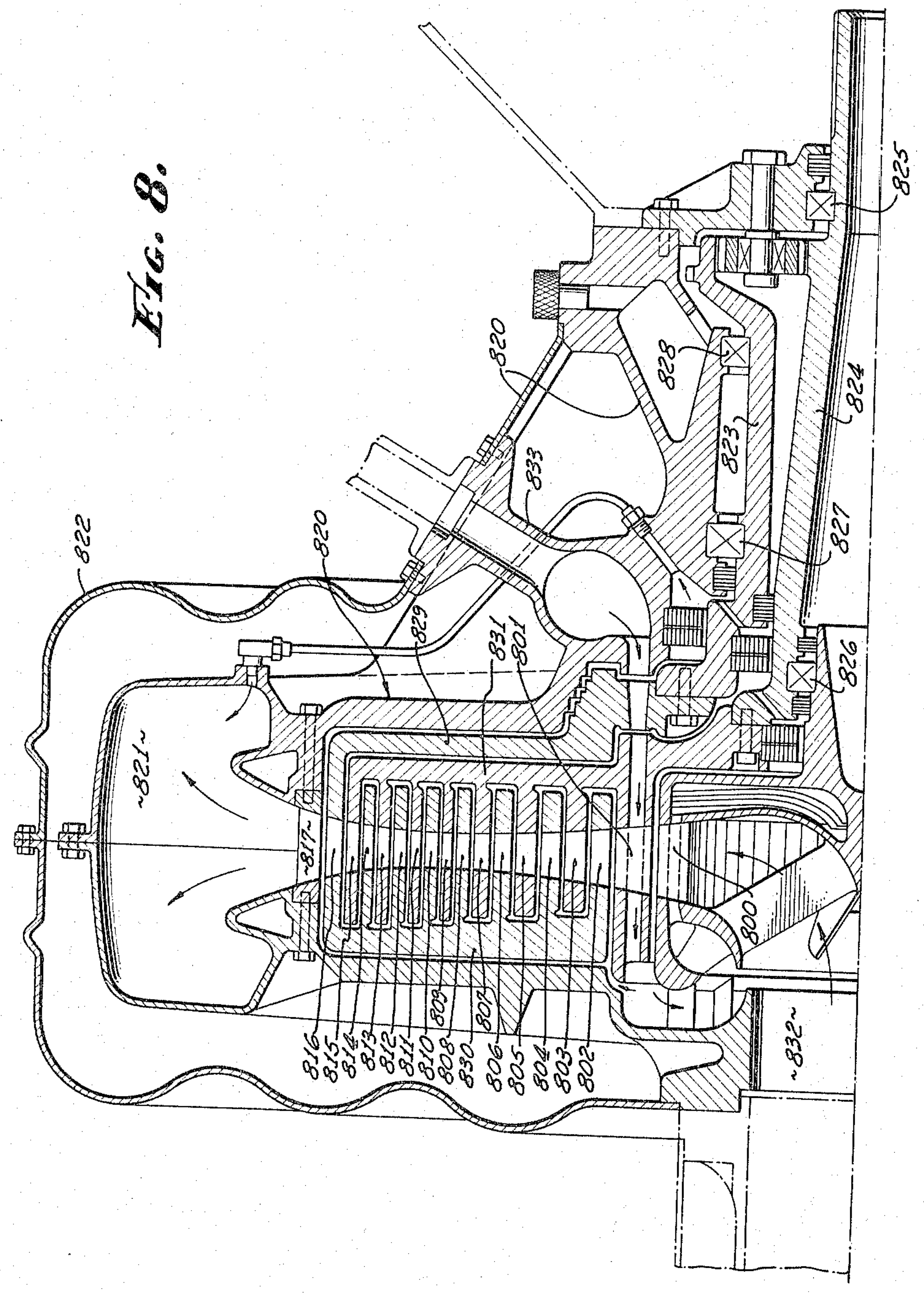
Figure 9:
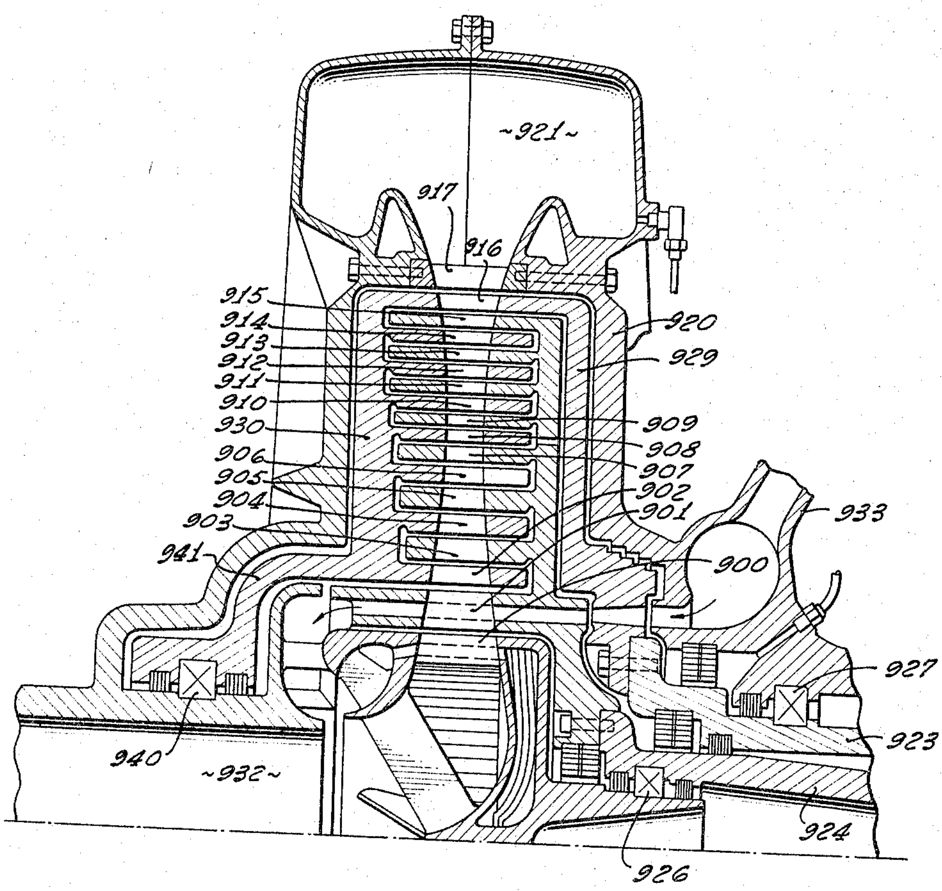

Proceeding now with the description of the mechanical structures of the machines, the axial sectional view of the steam turbines is illustrated in FIGS. 1 and 3, while the axial sections of the gas turbines are illustrated in FIGS. 5, 8, and 9. The corresponding transverse sections are illustrated in FIGS. 2 and 6, respectively. The blading for a gas turbine is also illustrated on an enlarged scale in FIGS. 12 and 16.

*Radial centrifugal flow steam turbine—FIGS. 1, 2, 3, and 4*

Referring to FIG. 1, the steam turbine is provided with a stationary frame 1A, a scroll 1 surrounded by a metallic wall 2 spaced from the scroll 1, and an insulation medium 3, such as aluminum foil, may be placed between the scroll 1 and the wall 2 for diminishing the heat losses from the scroll. An output diffusion stator 27 is connected to scroll 1 by means of circumferentially positioned bolts, such as bolts 4 and 5. An axially mounted stationary main steam duct 6 is connected to the main frame 1A by means of appropriate flanges and bolts 7 and 8. The diameter of the main duct 6 is a function of the rate of flow of the working fluid. This diameter is determined by the designer by selecting an appropriate speed of flow of the fluid to the turbine at the prevailing or anticipated load conditions. The duct 6 has a 90° turn, the lower, left part of the duct, indicated by a dimensional line 59, being the axial portion of the duct since the longitudinal axis 58 of this portion of the duct coincides with the rotational axis 58 of the turbine. The axial portion of the duct then blends into the radial portion which is indicated by the dimensional line 60. The radial portion of the duct terminates in the expansion stator 13, which will be described more in detail later. It should be mentioned here that the diameter of the expansion stator 13 should be made as small as possible, to reduce the influence of high temperature upon the central structure of the turbine to an absolute minimum. A bleed-off scroll 9, provided with a toroidally shaped steam chamber or duct 10 and vanes 11, may be connected to the main frame by means of bolts 7 and 8. A funnel-shaped circumferential duct 67 connects the toroidally shaped scroll 9 with the turbine stage 20 with the result that a portion of the steam leaving stage 20 is bled off for heating feed water of the power plant.

The path of the steam upon its leaving the central duct 6 is through the expansion stator 13 and then through the turbine stages of the first and second turbine rotors. The first turbine rotor includes the first stage 14, the third turbine stage 16, the fifth turbine stage 18, and the seventh turbine stage 20. The first rotor also includes a left side-disc 30 a right side disc 31, an inner shaft 32, and a plurality of hoop-rings such as hoop-rings 33 and 34, which are used for supporting the turbine blades within each stage.

In the view illustrated in FIG. 1, the inner surfaces of these hoop-rings, i.e., the inner surfaces adjacent to the turbine blades, define the axial dimension of the flow channel of the turbine; this channel converges up to the stator stage 21 and then diverges from stage 22 to the rotor stage 26, and continues to diverge in the output diffusion stator 27. The configuration of the sidewalls of the flow channel, as viewed in the axial plane illustrated in FIG. 1, is controlled by the desired degree of expansion to be obtained within the respective flow channels of the stages, and the continuity equation.

The turbine is also provided with the second rotor including a side-disc 36 and a plurality of stages 15, 17, 19, 22, 24, and 26. The outer end 41 of shaft 37 is provided with a ring gear 42 which engages four gear pinions, 43a–43d, FIG. 4, mounted on anti-friction bearings and studs 44a–44d. A similar ring gear 46 is provided on the mid-portion of the inner shaft 32 which also engages the pinions 43a–43d.

The transverse view of the gear system interconnecting the inner and outer shafts 32 and 37 is illustrated in FIG. 4; there are four pinions, 43a to 43d, circumferentially mounted on frame 1A by means of studs 44a–44d. The inner shaft 32 is supported by means of the anti-friction bearings 47 and 48, the latter bearing being mounted on the axial extension 49 of the stationary duct 6. In order to provide a rigid, structural support for the extension 49 of the central duct, this duct is also provided with a plurality of streamlined vanes 51, 52, etc., which connect the end wall 50 and the extension 49 to the main frame 1A through the outer wall member 53 of the central duct 6.

The second shaft 37 is supported by the main frame through two anti-friction bearings 56 and 57.

Steam turbines almost invariably have bleed-off ducts, and it is for this reason that the turbine has been illustrated incorporating such duct so as to demonstrate the feasibility of having such bleed-off ducts with the disclosed turbines.

The turbine is also provided with the labyrinth seals 61, 62, 63, 64, 65, and the stage seals, such as 66 and 67, between the hoop-rings of adjacent turbine stages. These seals, and small orifices in the disc, such as an orifice 81, are used to eliminate any side thrust that may be produced by the working fluid under pressure.

The turbine is also provided with the high pressure seals 68, 69, 70, 71, 72, 73, and 74. The high pressure seals 71 and 74 isolate the gear box space 75 from the working fluid. This gear box is filled with a lubricant and the high intensity seal 73 prevnets the leakage of this lubricant out of the gear box.

The inner shaft 32 extends to the right, as viewed in FIG. 1, beyond frame 1A and terminates in the splined end 76, which is used for connecting the turbine rotors to an external load.

FIG. 1 illustrates a contra-rotating turbine between the stages 14 and 20. It is then a single rotation turbine because the rotating turbine stages 22, 24, and 26 are positioned between the respective stationary flow-turning or flow-turning-and-expansion stator stages 21, 23, 25, and 27.

The transverse section of the turbine of FIG. 1 is illustrated in FIG. 2. The blading 200 of the inner expansion stator 13 represents converging cambered expansion nozzles converting the high potential energy of gases or steam on the inner side of these nozzles to a high kinetic energy fluid emerging from these nozzles. It is known that a Mach number greater than 1 can be achieved in a flow channel which is first converging and then diverging. It has been found, however, that it is possible to reach a Mach number up to approximately 1.3 even when the nozzle is only a converging nozzle, and does not have any diverging, trumpet-shaped portions at the trailing ends. Such high Mach numbers and high exit velocities are obtainable due to the divergence or deviation in the fluid flow which always appears after such fluid leaves the nozzle, with the result that the fluid becomes accelerated even to a higher velocity than that obtained in the flow channel per se. The above also applies to an expanding cascade of a turbine; the flow channel can be theoretically extended, so to speak, in one's imagination, and it then appears to be actually diverging insofar as the imaginary part of the nozzle is concerned. Therefore, if a local Mach number 1 is reached in the narrowest width of the channel immediately at the trailing tail of the blade, the flow will continue to expand upon its leaving the real flow channel and will reach a Mach number higher than 1 in the interstage gap, which is beyond the flow channel. Therefore, $M_{c1}=1.3$ is an example of a feasible maximum local Mach number for the expansion cascade 13 and its converging flow channel defined by the blades 200 in FIG. 2 and the blades 1203 in FIG. 12. It should be understood, however, that the value of this Mach number is a matter of design, and, therefore, this invention is not restricted to any specific Mach number, such as 1.3.

A more detailed description of the subsonic staging will be given later in connection with FIG. 12.

Figure 11:
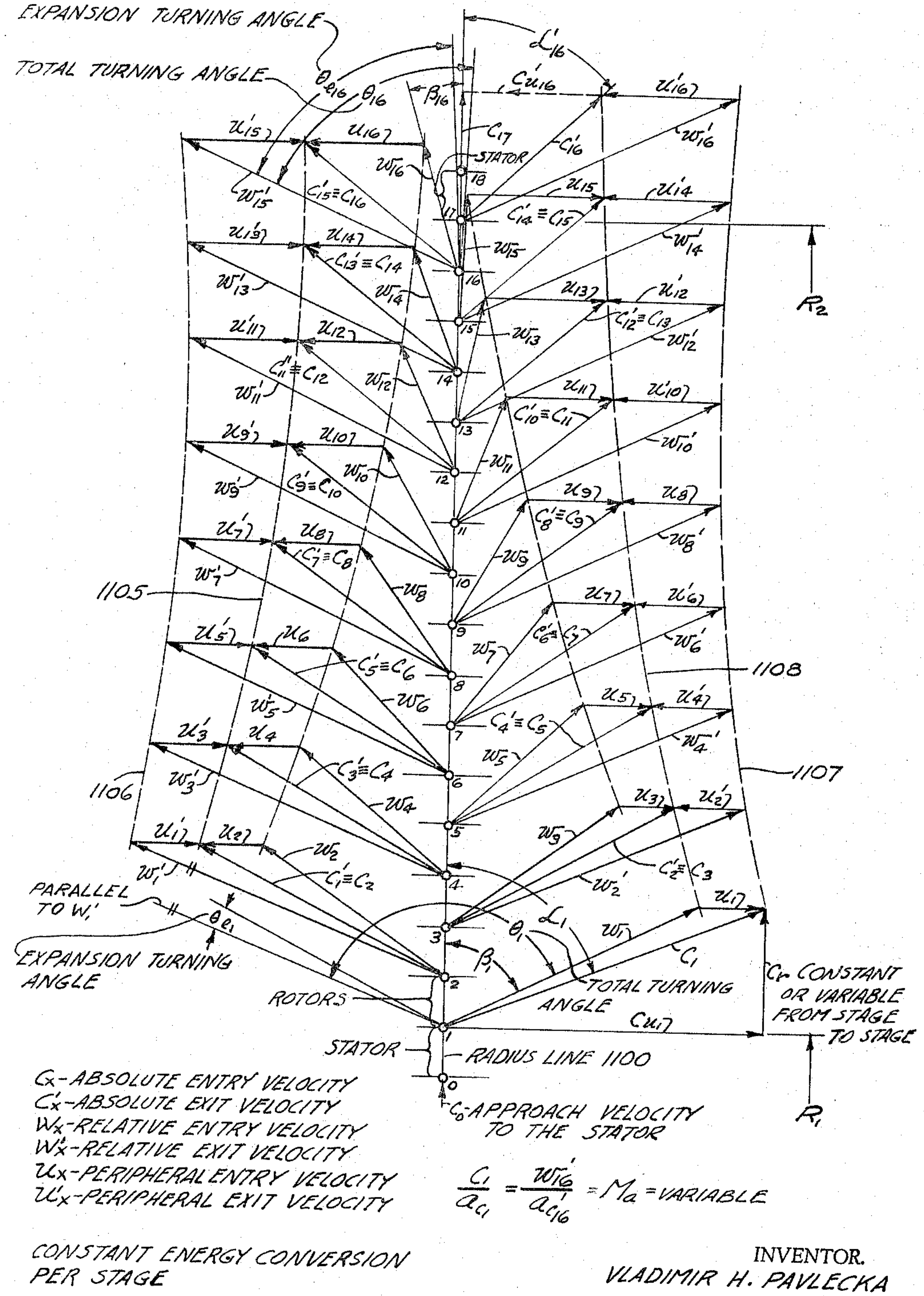

The acceleration in the fluid produced by the introduction of the expansion stator stage is illustrated vectorially in FIGS. 10 and 11. FIG. 10 is the constant exit Mach number diagram and FIG. 11 is the constant energy conversion diagram. These figures will be discussed more in detail later. Suffice it to say at this time that fluid enters stator 13 at an absolute velocity $C_0$, which is indicated as the "approach velocity." It is the velocity of the fluid within the radial portion of duct 6. The fluid leaves stator 13 at an absolute exit velocity $C_1$ and an angle $\alpha_1$, with respect to the radius line 1100. In FIGS. 10 and 11, $C_1$ is the maximum absolute velocity in both vector diagrams.

As will be pointed out later, $C_1$ should be the maximum absolute velocity for the optimum mode of operation.

FIG. 13 illustrates enthalpy-entropy polytrope of the working fluid at the exit from the last turbine stage and the state of the fluid at the exit from the stator diffusion stage, or, stated differently, the state of the fluid in the hood upon its emergence from the diffusion stator. Instead of letting the polytrope of the turbine stop at point 17' in FIG. 13, which corresponds to temperature $T_{17'}$, pressure $P_{17'}$, and velocity $C'_{17'}$, $P_{17'}$ corresponding to the pressure within the hood, the exit stator permits one to expand the working fluid to point 17 having a lower pressure $P_{17}$, lower temperature $T_{17}$, and high absolute velocity $C'_{17}$. This lower pressure is between the last rotor and the diffusion stator, i.e., it is in the gap between the outer periphery of the last turbine stage and the inner periphery of the diffusion stator. This gap is illustrated in FIG. 12 at 1210. To convey the gases from this gap, the diffusion stator receives these gases or steam at relative high velocity $C'_{17}$ and compresses or diffuses them to point 18 along line *d* from pressure isobar $P_{17}$ to pressure isobar $P_{17'}$. The diffusion process diminishes velocity $C'_{17}$ to a low velocity $C'_{18}$ where $C'_{18}$ can be much lower than velocity $C'_{17}$, the latter being the velocity with which the working fluid would have reached the exhaust hood had there been no diffusion stator provided at the exit. Therefore, it is possible to recover the heat energy $\Delta H_e$ and convert it into useful work, the amount of this heat energy being equal to $$H_e=A\frac{(C'_{17'})^2-(C'_{18})^2}{2g}-H_{h_{17'}}-H_{h_{18}} \quad (1)$$

where $\Delta H_e$ is the heat energy converted into mechanical work with the aid of the diffusion stator, which can also be defined as diffusion enthalpy of the stator;

$C'_{17'}$ is the absolute velocity of the fluid at the exit from the last rotor stage;

$C'_{18}$ is the absolute velocity of the fluid at the exit from the stator stage which can be also defined as the absolute velocity of the fluid in the hood or scroll of the turbine;

A is a conversion constant.

$\Delta H_{h_{17}}$, is the loss in head in the gap between the last rotor stage and the stator;

$\Delta H_{h_{18}}$ is the loss of head in the wakes on the downstream side of the output stator.

The stator diffuser stage at the exit of the turbine will thus improve the efficiency of the last rotor stage and at the same time will diminish the transportation losses within the hood and the ducting that follows after emergence of the fluid from the turbine. It also acts as convenient and desirable mechanical element for holding together the exhaust hood structure.

FIG. 3 discloses an additional version of the steam turbine; the configuration of this turbine is identical to that of FIG. 1 with the exception of the outer portions of the two rotors. In FIG. 1 only the inner portion of the turbine is a contra-rotating turbine, i.e., the portion up to the bleed-off scroll 9 and the stator stage 21. Beyond stage 21 the turbine in FIG. 1 is a single rotation turbine with the second rotor turbine stages 22, 24, and 26 being positioned between the stator stages 27, 25, 23, and 21.

The difference between the two figures resides primarily in the fact that the first rotor 30 is now continued beyond the bleed-off scroll 9, which is accomplished by means of a U-shaped member 31 which is connected to the outer side-disc 91A through the first rotor turbine stage 92A. The upper side-disc 91A is also provided with the turbine stage 93A and the turbine stage 94A. Accordingly, the entire turbine is a contra-rotating turbine.

The remaining elements of this turbine correspond to the identically numbered elements in FIG. 1, and, therefore, need no additional description. The efficiency of the turbine illustrated in FIG. 3 is somewhat higher than that of the turbine illustrated in FIG. 1.

*Gas turbine—FIGS. 5, 6, 7, 8, 9, and 12*

The gas turbines illustrated in FIGS. 5, 8, and 9 do not differ markedly from the steam turbines illustrated in FIGS. 1 and 3. They also have an expansion stator stage at the entry into the turbine and a diffusion stator at the exit from the turbine. Since there is no water to preheat in the gas turbine power plant, the bleed-off is not present in these turbines. It should be noted that these turbines can be used also as steam turbines when steam bleeding is not required.

The most important difference between FIGS. 1 and 3 and FIGS. 5, 6, 8, and 9 resides in the fact that the first turbine stage and the expansion stator stage are cooled stages. With this type of air or wet steam cooling of blades of the turbine and the stator blades, it is possible to operate the turbines at very high temperatures, such as in the order of 2200° F. for gas turbines and 1500° F. for steam turbines.

In view of the prior description of the steam turbines, it will suffice merely to mention and enumerate the main elements of the gas turbines and then proceed with a more detailed description of the blade cooling system. The first rotor of the turbine includes the left side-disc 500, the right side-disc 501, an inner shaft 502, and the turbine stages 504, 506, 508, 510, 512, 514, 516, and 518. The second rotor includes the right side-disc 522, an outer shaft 523, and the turbine stages 505, 507, 509, 511, 513, 515, 517, and 519. This turbine is also provided with a diffusion stator 520. The entire structure is supported by means of a main frame 524, which is provided with a cooling fluid duct or pipe 525 connected to the frame by means of flanges 526 and appropriate bolts not indicated in the figure. The main frame 524 also includes a cooling fluid pipe 527 and a toroidal chamber 528 which distributes the cooling fluid around the periphery of the turbine.

Figure 12:
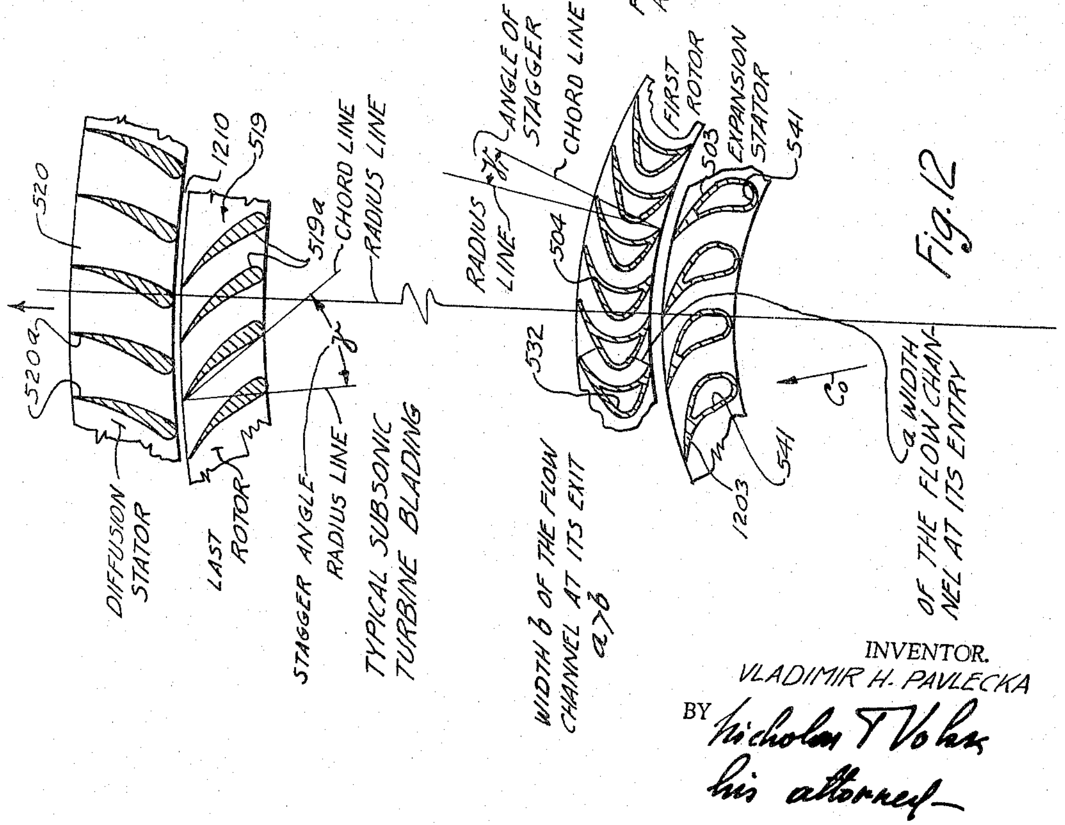

Before proceeding any further with the description of the cooling system, it should be noted here that its plan view, taken along line 7—7, FIG. 5, is illustrated in FIG. 7, and, therefore, its description should be read with the aid of FIGS. 5, 7, and, to some extent, FIG. 12.

The inner portion of the toroidal chamber 528 is provided with a plurality of orifices 529, which are uniformly distributed around its periphery. The side-disc 522 is also provided with a plurality of orifices 530 uniformly distributed around its periphery. Similar orifices 531, 532, and 533 are provided, respectively, in the outer portion of the side-disc 501, the blades, such as blades 504, and the inner portion of the side-disc 500. The blades 504 are the blades of the first turbine stage which are also shown in FIG. 12, where the orifices or the cooling channels 532 are visible in cross-sectional view.

The outer left stationary side-disc 534 is provided with a cooling manifold 535 which includes a plurality of cross-braces such as cross-braces 536 and 537 uniformly distributed around the periphery of the manifold. The manifold is also provided with an outlet 538, a collecting manifold 539, and a plurality of cross-braces 540. The cross-braces 536, 537, and 540 are formed as airfoils to reduce the amount of friction losses to a minimum. The manifold 539 communicates with orifices 541 in the blading 503 of the expansion stator, and the cooling ducts or orifices 541 of the stator also communicate with a chamber 542 provided in the stationary duct wall 543. This wall is also provided with a plurality of orifices 544 which are directly in line with the plurality of orifices 545 in the inner side-disc 501 of the first rotor.

The functioning of the cooling system is as follows: air, or wet steam, under high pressure, is pumped into a pipe or duct 525, and it flows in the duct in the direction indicated by an arrow 546. It then enters the toroidal chamber 528 and it leaves the latter through the plurality of orifices 529, which are provided in the inner part of the toroidal chamber 528. This latter flow is indicated by an arrow 547. The cooling fluid then enters the orifices 530 whereupon it flows through the orifices 531, the cooling channels 532 in the blades of the first turbine stage, and then through the orifices 533. Upon leaving these orifices, as indicated by an arrow 548, it enters the cooling manifold 535, and it leaves the latter through the circumferential duct slits 538 and enters the duct itself in the manner indicated by an arrow 549, where it joins the heated gases and is discharged into an exhaust hood or scroll 550 after passing through all the turbine stages.

As indicated in the orifice 531 by arrows 551 and 552, the cooling air entering the orifices 531 is divided into two streams, the stream indicated by an arrow 551 being used for cooling the first turbine stage 504 while the stream indicated by an arrow 552 enters orifices 545 and then orifices 544 in the wall 543 of the stationary input duct 553, whereupon this portion of the cooling fluid enters chamber 542. Chamber 542 is provided with a plurality of heat reflecting metallic members 554, and the cooling fluid, entering chamber 542, cools these heat reflecting members, whereupon it emerges into a manifold 539 by passing through the cooling ducts 541 of the expansion stator 503. This flow of the cooling fluid is indicated by an arrow 555. This stream of fluid then joins the stream illustrated by an arrow 549.

The energy of the cooling fluid is not lost but largely is recovered and made to work through all the stages of the turbine.

It is desirable to cool as effectively as possible the wall 543a of the main input duct 553 in order to protect the bearing and labyrinth seal systems from excessive heat radiations. Such protection is especially desirable for bearing 556 and the high pressure seals 557, 558, and 559, which all have direct contact with the axial extension or boss 560 of the main input duct 553.

The outer shaft 523 is provided with an orifice 561, and frame 524 is provided with an orifice 562 which is connected to a pipe 563. This pipe interconnects orifice 562 and hood 550. Any gases or cooling fluid which may seep through the high pressure labyrinth seals 564 and 565 is ducted or conveyed through the orifices 561, 562, and pipe 563 into exhaust hood or duct 550. This prevents the leakage of any heated air into the remaining bearings and the labyrinth seal systems. A breather system is provided for a chamber 566 which is the chamber between outer shaft 523, a bearing 567, and a wall portion 568 of the main frame 524. This is accomplished by providing an opening 569 and a breather plug 570 in a duct 572 with the result that the chamber 566 and chamber 573 are maintained at atmospheric pressure. Both of the chambers are filled with an appropriate lubricant for the gear system, including the pinion gear 574 and two ring gears on the shafts 523 and 502.

The cross-sectional view of the turbine blading is illustrated in FIG. 6 and its operating values will be described in connection with FIGS. 10 and 11, which are the velocity vector diagrams for the turbines, and FIGS. 12 and 16, which are the cross-sectional views of the blading, like FIG. 6, but on an enlarged scale.

Because of direct similarity between FIGS. 5 and 8, it is necessary only to point out the most important elements in FIG. 8 and the difference between these figures. The elements are: fluid-cooled expansion stator 800, stages 801–816, stator 817, exhaust hood 821, heat shield 822, frame 820, cooling fluid duct 833, side-discs 829, 830, and 831, input duct 832, four bearings 825–828, shafts 823 and 824. The remaining elements are not numbered in FIG. 8. In FIG. 8 all the even-numbered stages 802–816 are supported through the blading of the outermost stage 816 while in FIG. 5 all the even-numbered stages are supported through the blading 504 of the first and the innermost stage of the turbine. The penalty of the structure disclosed in FIG. 5 resides in the fact that the second rotor is supported through the blading of the turbine stage having the smallest diameter, and, therefore, it is the weakest mechanically, but it has the advantage of having only two side-discs such as side-discs 500 and 522. On the other hand, in FIG. 8 all the even-numbered turbine stages 802–816 are supported through the blading of the strongest outermost stage 816, but this advantage is obtained at the expense of introducing an additional side-disc such as side-disc 829 or side-disc 830.

The windage losses in FIG. 8 will be somewhat higher than the same losses in FIG. 5.

FIG. 9 illustrates an additional modification of what is illustrated in FIGS. 5 and 8 in that the side-disc 930 is now provided with a bearing 940 mounted on the stationary duct 932. The side-disc 930 now has been extended at 941 to rest on bearing 940. Such structure relieves the stresses that are otherwise imposed on blading 916 of the sixteenth stage of the turbine. It is quite obvious that the structure disclosed in FIG. 9 represents the best mechanically balanced structure of all the structures disclosed thus far in any of the figures, but such advantage is obtained at the expense of adding an additional side-disc and an additional bearing.

The remaining elements in this figure bear the same numerals as those used in FIG. 8 but having the 900 series, such as stators 900, 917, turbine stages 901–916, etc.

*The vector diagrams for the radial, centrifugal flow steam or gas turbines*

The constant Mach number and constant radial velocity vector diagram for a sixteen stage steam turbine with input and output stators is illustrated in FIG. 10. The basis of the concepts for energy conversion, already outlined in the earlier part of the specification, are:

(A) Rapid conversion of the potential energy into kinetic energy at the entry into the turbine; when there is an input stator, then this rapid conversion takes place in the stator. This is the preferred version of the machine. When there is no stator, then the first rotatable stage is converted into an acceleration stage or very rapid expansion. This is accomplished by making the angle of turning of the first rotatable stage quite small and the degree of convergence, causing expansion, maximum of all the rotatable stages. From then on, beginning with the second rotatable stage, the two turbines, with and without stator, are identical and are either substantially constant Mach number turbines in one version and constant energy conversion turbines in the second version.

(B) In both versions, the rate of energy conversion of all stages in the three methods disclosed here, i.e. the stator method, the first stage method, and the swirl velocity method as compared to the known methods, is increased as an inverse function of the radius of the stages. In the known method now in use in centrifugal flow turbines the energy conversion increases toward the last stage; in the disclosed methods it is constant in all stages of the axial and radial flow turbines in the first case, where there is an input stator, and is constant in the second and third cases from the second stage and on. This is accomplished by (a) Increasing the angle of turning of all stages as an inverse function of the radius, such increase in the angle of turning, in turn, produces the following effects:

(i) It enables the stages to receive the fluid with a much greater peripheral entry and exit components $C_u$ and $C_u'$ of the absolute velocities $C_n$ and $C_n'$, the peripheral components $C_u$ and $C_u'$ being the only energy producing components;

(i′) It enables one to obtain greater energy conversion because of the greater change in the direction of the momentum of the fluid flowing through the stage;

(i″) It enables one to accelerate the fluid to a greater degree through all the stages which is due to the increase in that component of the angle of turning which produces expansion and an increase in the flow velocities.

The above concepts then may be summarized by merely stating that the relative exit velocity local Mach numbers $M_{W_x'}$ at the exit from the respective rotatable turbine stages are maintained constant, or nearly constant, through all the contra-rotating and single rotation stages of the turbine, with $M_{c_x'}$, which is the Mach number of the absolute exit velocities from the stators of the single rotation turbine being also constant and equal to $M_{W_x'}$ in the constant Mach number version of the method. In the second version of the method all stages have equal, or substantially equal, energy conversions.

According to FIG. 10, the expansion begins at a very high rate in the first expansion stator 13, FIG. 1, or stators 503, 800 and 900, FIGS. 5, 8, and 9, respectively.

It is preferable to have the radial velocity $C_r$ remain constant as one progresses from radius $R_1$, which corresponds to the radius of the inner periphery of the first rotatable turbine stage, and, up to and including $R_2$, which corresponds to the radius of the outer periphery of the last rotatable turbine stage. If the radial velocity increases or decreases, the energy conversions per stage and the exit Mach numbers will increase from the first stage toward the last stage, which is not the optimum mode of operation. For this reason only the vector diagram with constant $C_r$ is illustrated, although it is also possible to make $C_r$ decrease or increase but with the above concomitant disadvantages.

The following additional observations follow from the study of FIG. 10, which is for the contra-rotating centrifugal flow machines:

$$\frac{W_x'}{a_{c'_x}}=M_{w'_x}=\text{constant} \qquad (2)$$

where $W'_x$=relative velocity of fluid at the exit from stage 16 of the turbine;

$a_{c'_x}$=local velocity of sound;

$M_{w'_x}$=exit Mach number for any rotor stage X;

$W'_x$ are the relative exit velocities.

The above Mach number $M_{w'x}$ remains constant when there is a constant Mach number method of operation; this Mach number decreases toward the last stage in the constant energy conversion case illustrated in FIG. 11. In the known method for the radial flow turbines the Mach number increases toward the last stage.

Examination of FIGS. 10 and 11, which are the vector diagrams for the centrifugal flow turbines, indicates:

(a) Either the exit Mach (FIG. 10) number or the energy conversion (FIG. 11) remain constant;

(b) The total turning angle, $\theta$, decreases as a function of the radius of the stage. In the examples illustrated in FIGS. 10 and 11, which are for a 16-stage steam turbine, this angle begins with $\theta_1$ which is in the order of 140° and is in the order of 80° for the last, 16th, stage. The range of values is in the order of 100°–150° for $\theta_1$, and 60° to 90° for $\theta_{16}$. When the number of stages is decreased, the above range will remain substantially the same. In the known method $\theta$ remains constant in all stages;

(c) The expansion component $\theta_e$ increases from the first stage to the last stage, with $\theta_{e1}$ being in the order of 5° and $\theta_{e16}$ being in the order of 55°. The range is in proportion to the range for $\theta$;

(d) The stagger angle $\gamma$ increases with the radius, approaching 0° in the first rotatable stage when there is an input stator (FIG. 12), and approaching 0° either from the positive or negative side (±), and being in the order of 40° to 60° in the last rotatable stage. In the known method, $\gamma$ remains constant;

(e) The radial velocity $C_r$ remains constant while it increases in the known method;

(f) No specific limits can be given for the rate of convergence of the flow channels from stage to stage because this parameter depends on the initial state of the working fluid. However, it can be stated that all channels are increasingly converging with the increase of the radius.

In FIG. 10, lines 1005, 1006, 1007 and 1008 are straight lines and are converging toward the last stage, and, therefore, while the peripheral velocities, *U's*, increase linearly, all other velocities, absolute as well as relative (*C's*, *W's* and $C_u$*'s*) decrease linearly toward the last stage, which is the direct opposite of what is found in the known method practiced with the known centrifugal flow machines.

FIG. 11, is a vector diagram for the constant energy conversion per stage, the only difference between FIGS. 10 and 11 is that lines 1105, 1106, 1107, and 1108 are convex as viewed from the radius line.

The above velocity diagrams and relationships hold true when $C_r$, the radial velocity, remains constant.

Comparing the power distribution among the stages with the dislosed constant Mach number method of operation and the known method, one obtains:

For constant weight flow of the working fluid, the power of each stage is a function of the radius of the stage, which follows from the equation below:

$$\Delta N_x = \psi(U_x^2) = \xi(R_x^2) \qquad (3)$$

where $\Delta N_x$=output of stage $x$; ft. lb./sec.;
$\psi$=function of peripheral velocity of stage $x$;
$U$=peripheral velocity of stage $x$;
$\xi$=function of radius of stage $x$;
$R_x$=radius, ft. of stage $x$.

In FIG. 10, the ratio $$\frac{R_1}{R_2} = 0.386$$

Squaring $$\frac{R_1}{R_2}$$

gives one $$\left(\frac{R_1}{R_2}\right)^2 = (0.386)^2 = 0.149 \qquad (4)$$

which is the ratio of power output of the first turbine stage to the last turbine stage, if congruent triangles are used, as in the classical, known centrifugal flow turbines.

However, in the velocity system used in FIG. 10, this ratio ($R_1/R_2$), when used in the computation of the power outputs of the first and the last turbine rotor stages, with the now much greater value of $\xi$, derived from the velocity components of FIG. 10 rather than velocity components of the known congruent triangles, then this power ratio produces the following:

$$\frac{\Delta N_1}{\Delta N_{16}} \simeq \frac{\Delta L_1}{\Delta L_{16}} \cong 0.96 \qquad (5)$$

where $\Delta N_1$=power output of the first stage;
$\Delta N_{16}$=power output of the 16th stage;
$\Delta L_1$=expansion head in the first stage;
$\Delta L_{16}$=expansion head in the 16th stage.

Accordingly, in the classical turbine, the first stage would develop 14.9% of the power of the last stage. In the turbine illustrated in FIG. 10, the first stage would develop 96% of the power of the last stage. The second stage in FIG. 10 would produce .89 of the power of the last stage, etc. (see FIG. 19).

Although the above function is non-linear, as illustrated by a curve $L_x/L_{16}$ in FIG. 19 taking the average power of the classical turbine stage, from the curve $L_x/L_{16}$, FIG. 19, one obtains:

$$\frac{1+.149}{2} = 0.575 \text{ per stage} \qquad (6)$$

as an index number for all the classical turbine stages, and $$\frac{1+.89}{2} = 0.945 \qquad (7)$$

as an index number for the disclosed constant Mach number turbines, it follows that the disclosed constant Mach number turbines would have only 61% of stages required by the classical turbines, which follows from the ratio of $$\frac{.575}{.945} = .61 \text{ or } 61\% \qquad (8)$$

This figure would vary, depending upon the skill of application of this new method of expanding the working fluid, but it would be, in actual practice, somewhat greater than 60% because the non-linear relationship would increase it. In the constant energy conversion the ratio would be $$\frac{.575}{1} = .575 \text{ or } 57\%$$

and taking into consideration the non-linear shape of the curve $L_x/L_{16}$, it will be closer to 50%, i.e., the disclosed turbines will have one-half the number of stages of the classical turbine.

Such reduction of stages is very important in steam and gas turbines, and especially in steam turbines where a large number of stages is always required because only a small heat drop takes place in steam even when the latter experiences a relatively large pressure drop, and the speed of rotation of the rotors and the turbine stages must be maintained at a low value because such speed is fixed by standard electric current frequencies, such as 60 cycles per second.

In spite of the excess kinetic energy generated in the small diameter stages in the new method, the succeeding stages not only are fully able to convert the kinetic energy passed to them by the preceding stages, but, in addition, expand more, at an increasing rate, with the increase of stage radius. This is apparent from the ratio of velocities $$\frac{W_x}{W_x'}, \quad \frac{\text{(The relative entry velocity)}}{\text{(The relative exit velocity)}} \qquad (9)$$

the above vectorial quantities being also indicated in FIGS. 10 and 11. This ratio is $$W_1/W_1'=.851 \text{ for the first rotor stage} \qquad (10)$$

and $$W_{16}/W_{16}'=.4265 \text{ for the last rotor stage} \qquad (11)$$

the expansion being, therefore, $$\left(\frac{.851}{.4265}\right)^2=(1.995)^2=3.98 \qquad (12)$$

3.98 times greater in the last rotor stage, compared with the first rotor stage.

Taking the velocity given by Kearton, supra, in the classical turbines, the $W_x/W_x'$ ratio for all rotor stages is of the order of (.4265); this ratio does not change from stage to stage in the classical case because all classical stages expand at a constant rate because of congruent triangles. The new method expands at a low initial rate at the inner stages, but high velocities, and then at a non-constant rate which keeps increasing toward the large diameter stages, but with the decreasing velocities and increasing heat drops. The reason for obtaining constant or substantially constant energy conversions is that a large ratio $W_x/W_x'$ at high velocities makes a greater velocity difference than a small ratio $W_x/W_x'$ at low velocities. At the same time the increasing heat drops in the outer stages compensate for the decreasing velocities in the outer stages. The net result is that the energy conversion remains constant in the disclosed method and varies from 0.15 to 1 in the classical turbine. (See Equation 4.)

Examination of FIGS. 10 and 11 also leads one to the conclusion that, when a diffusion stator is used at the exit, then all turbine stages are high torque, high momentum stages since all $C_u$ components are much larger, sometimes as much as five times larger than the peripheral velocities U's even in the last stages. This follows from $$T=\frac{G}{g}\frac{C_uU}{\omega} \text{ inch pounds} \qquad (13)$$

where

T is torque produced by a rotor stage, inch pounds,
g is acceleration due to gravity ft./sec$^2$,
G is weight flow of working fluid lbs./ sec,
$C_u$ is peripheral component of absolute velocity of the fluid through a rotor stage, ft./sec.,
U is peripheral velocity of the rotor stage ft./sec.,
$\omega$ is the angular velocity of the stage, 1/sec.

Similarly, momentum, M is $$M=mC \qquad (14)$$

where $m$ is mass and C is the absolute velocity of the fluid.

Since all C's and $C_u$'s are very large, and larger than U's, all stages are high momentum and high torque stages, the torque and the momentum being higher by at least 50% than even in the conventional axial flow impulse turbines, which have the highest torque in the prior art.

Therefore, the meaning of the "high" torque as used in this specification means a torque produced by a rotatable stage in which $C_{u_n}$ and $C_{u_{n+1}}$ are both at least twice as large as $U_n$. Actually in the perferred versions the maximum limit may be as high as five times larger than $U_n$ for $C_{u_{n+1}}$. Accordingly the disclosed stages will have a torque which is at least 1.8 greater than the torque produced by the very best axial flow stage of the prior art, which is the impulse stage (Rateau).

As to the momentum, it will be much as 1.8 larger than than momentum produced in the stages of the Rateau turbine, which is the highest output and highest momentum stage in the prior art.

The above defines the meaning of the "high" torque, "high" momentum stages disclosed by this invention. Similarly, "high" energy conversion stage means that its energy conversion will be at least twice as high as in the Rateau impulse turbine and approximately twice as high as the mean energy conversion in the Ljungstrom turbine.

Figure 15:
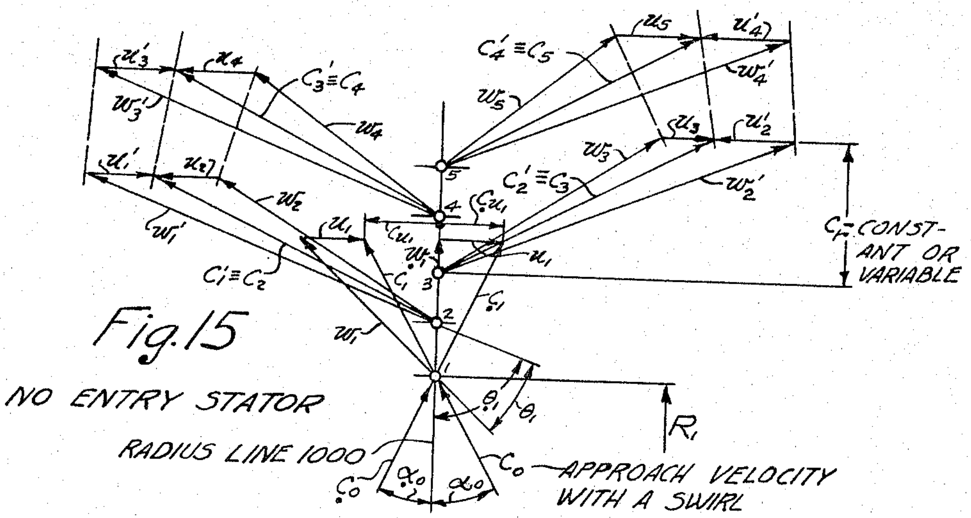
Figure 14:
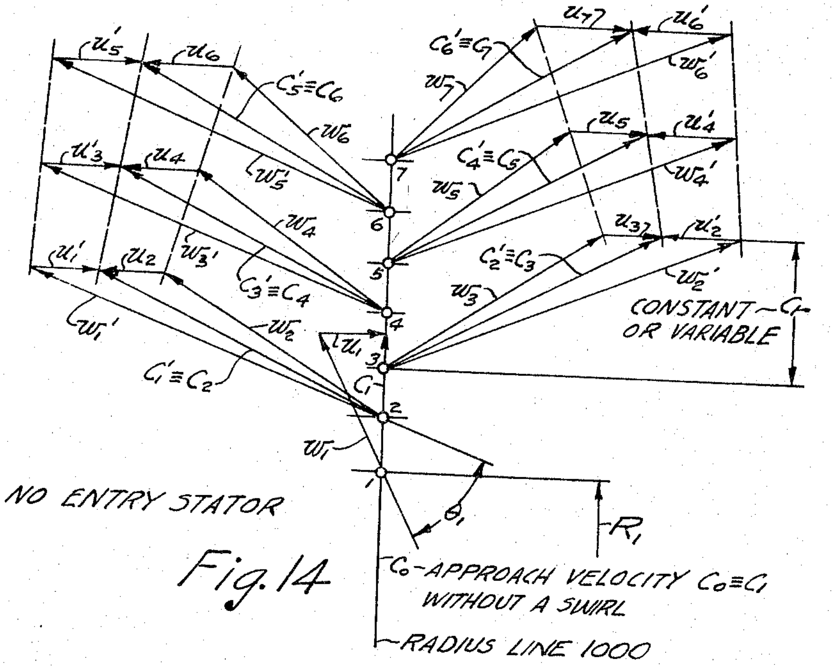

FIGS. 14 and 15 are vector diagrams for contra-rotating constant Mach number centrifugal flow turbines without any input stator.

In FIGS. 14, fluid approaches the first rotatable stage with a radial velocity $C_0 \equiv C_1$ and then enters the first stage with a relative velocity $W_1$. The relative entry velocity $W_1$ is accelerated to a relative exit velocity $W_1'$ and also turned through a total turning angle $\theta_1$. Velocity $W_1'$ in FIG. 14 corresponds to velocity $W_1'$ in FIG. 10. From then on FIGS. 14 and 10 are identical.

FIG. 14 indicates that the fluid can be accelerated to the desired exit velocity in the first rotatable stage rather than in the input stator, but in such case the energy conversion of the first stage into mechanical work will be reduced by approximately 50%, i.e., by one-half.

There are two cases illustrated in FIG. 15: in the first case fluid approaches the first stage with an absolute velocity $C_0$ and angle $\alpha_0$ which is to the right of the radial line 1000. In the second case the absolute approach velocity $C_0$ has the same magnitude but an angle $\underset{\cdot}{\alpha}$ which is to the left of line 1000. Examination of FIG. 15 illustrates that the loss in the energy conversion will be more than 50% in the case of $\alpha_0$ and less than 50% in the case of angle $\underset{\cdot}{\alpha}_0$ because $\underset{\cdot}{C}_{u_1}$ in this case has the same direction as $U_1$. $C_{u_1}$ opposes $U_1$ in the first case. All other parameters, from then on, are the same as in FIG. 10.

FIG. 17 discloses a vector diagram for a single rotation centrifugal flow turbine illustrated in FIG. 18 which also has a stator 1800 on the input side, a stator 1816 on the output side, a plurality of expansion stages 1801–1808 between the two input and output stators 1800 and 1816, and also a corresponding plurality of stators 1809–1815 between the turbine stages which represent the turning and the expansion stages in this machine. The single rotor 1820 also includes a side-disc 1821 and a single shaft 1822 supported on three bearings 1823, 1824, and 1825 and a frame 1826. The degree of expansion obtained in the stator stages of the turbine is illustrated by the difference between the absolute velocity vectors $C_2$ and $C_3$, $C_4$ and $C_5$, etc. The amount of expansion differences obtained in the stator stages is again determined either by the local Mach number which is maintained constant throughout all the rotating stages of the turbine in the constant Mach number version or by the fluid velocities in the stators and rotors which now must be adjusted to produce a constant energy conversion in each stage in the second version. The constant Mach number in this case is the same as that in the contra-rotating machine, i.e., it is $M_{w'x}$, which was defined previously.

The type of blading that would be used in the single rotation machine does not differ from that used in the double rotation machine except for the stator stages, the angle of turning obtained in the stator stages being illustrated in FIG. 17 by the angle between the absolute velocities $C_2$ and $C_3$, $C_4$ and $C_5$, etc. The stator stages are turning-and-expansion stages, the expansion being practiced in the stators as well as the rotors. The angles of turning are $\theta_s$ for stators and $\theta_r$ for rotors. The degree of expansion in the rotors is approximately equal to the degree of expansion in the stators, and the turbine is a 50–50 reaction turbine but with the distorted velocity triangles because of the rapid initial expansion and large $C_1$. The energy conversion of the single rotation stages will be approximately half of the contra-rotating stages.

Figure 16:
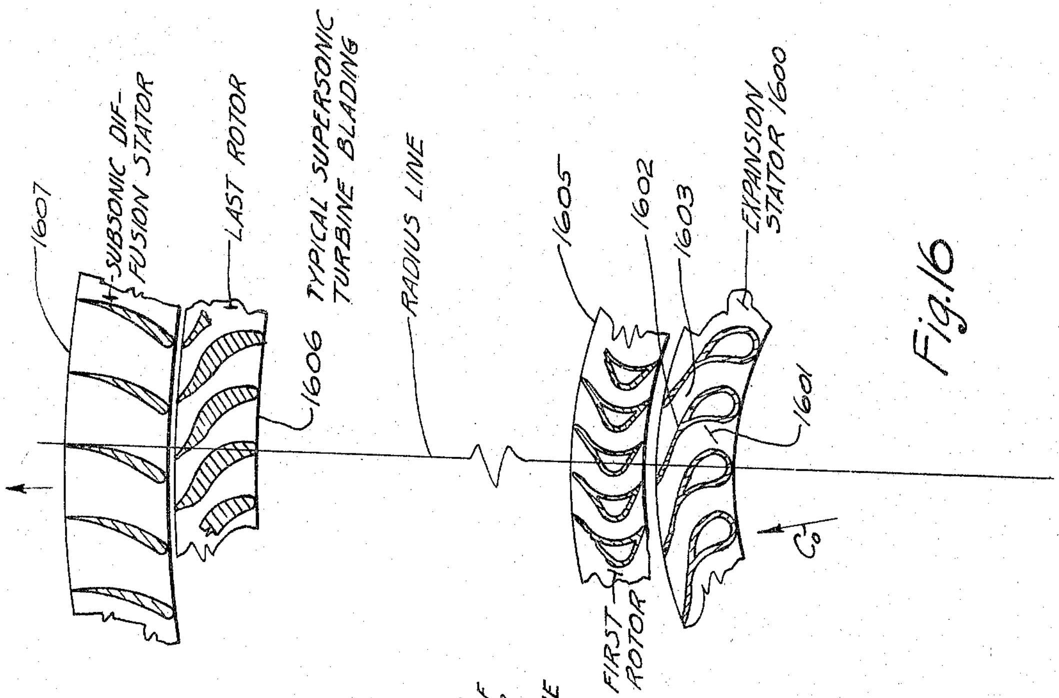

FIG. 16 is a cross-sectional view of the supersonic version of the turbine which operates either as a constant Mach number or a constant energy conversion machine. A stator 1600 has a plurality of converging-diverging channels, the converging portion being 1601 and the diverging portion being 1602. A throat 1603 separates the two. Throat 1603 and diverging portion 1602 form a supersonic nozzle which may be either a DeLaval nozzle or a contoured nozzle. The same is true of all the remaining rotatable stages, such as 1605 and 1606 which are the first and the last rotatable stages. The diffusion stator 1607 is identical to stator 520 in FIG. 12. In FIG. 16, therefore, all stages are supersonic, except stator 1607.

FIG. 19 illustrates a family of curves which illustrate the expansion process throughout all the stages of a typical contra-rotatable radial flow turbine described in this invention.

Curve $E_x/E_1$ appearing at the bottom portion of FIG. 19, represents the ratio of the absolute kinetic energy head, $E_x$, across any given stage divided by the kinetic energy head, $E_1$, across the first stator stage i.e. the expansion stator. This ratio is the highest in the first stage, where it is equal to unity, and it then diminishes very rapidly as one progresses through the first three stages; it is nearly constant through the remaining stages of the turbine. This ratio indicates the rate of conversion of the potential energy into kinetic energy in the respective stages, including the input stator; since the ordinate is equal to unity for the input stator, it follows that the above conversion is maximum in the input stator, and less than unity in all the rotor stages. It follows from the above curve that if the first stator were not present, this curve would have very small ordinate values throughout all the turbine stages, and, therefore, it would have been impossible to load the innermost stages with the kinetic energy in the manner indicated in this curve. The $E_x/E_1$ ratio also may be considered as the kinetic energy increment produced in the respective stages, and it illustrates that the greater portion of this curve is almost a straight line which is parallel to the abscissa. The asymptotic portion of the curve, next to the ordinate, indicates that there is a very rapid conversion of the potential energy of the working fluid into kinetic energy within the input stator, which is then converted into work in the succeeding rotor stages of the turbine.

The rate of conversion of the kinetic energy into work in the respective stages is expressed by the curve $E/L_x$. The $E/L_x$ ratio is the ratio of the asbolute kinetic energy head, E, across any given rotor stage divided by the work delivered by the same stage. The shape of the curve begins at a high value in the first stage and diminishes first rapidly and then slowly toward the last outermost stage. It expresses the availability of the kinetic energy at any stage in terms of its power output. The amount of the available kinetic energy in the small diameter stages is very large, and in the large diameter stages very small. This curve then expresses the distribution of the available kinetic energy throughout all the stages in the radial direction. The curve also indicates that there is a rapid conversion of the kinetic energy into work in the outer stages, even though a large amount of the kinetic energy is conveyed to these stages from the inner stages, in addition to the kinetic energy developed within these outer stages.

The mechanical work accomplished by each stage of the turbine at constant Mach number operation is expressed by the curve $L_x/L_{16}$ in terms of the work done by the largest diameter stage, $L_{16}$, which is the mechanical work actually delivered by the last or the outermost rotating turbine stage. In the illustrated example, this stage is the 16th turbine stage. This ratio varies from about 0.9 to about 1.05 of the output of the last turbine rotor stage. This means that even the innermost stages of the smallest diameter convert very nearly the same amount of energy into work as the largest diameter stage, and that all the rotor turbine stages are very evenly loaded throughout the turbine. The intermediate stages actually produce a larger amount of work than the outermost stage.

The constant Mach number curve 1900 can be converted to a constant energy conversion per stage straight line parallel to abscissa 1901 by selecting point 1902 as the basis for all other stages or by selecting point 1903 for the same purpose. This will produce lines 1904 and 1905. Also, any number of other parallel lines may be obtained by taking any point as a reference which is between lines 1904 and 1905. The limits for maximum line 1904 and minimum line 1905 are established by the limits of the exit Mach number for any given blade and flow channel design, one being unprofitably too low and the other unprofitably too high, i.e., producing too high losses in the latter case.

This curve $L_x/L_{16}$ should be compared with a corresponding curve $$\left(\frac{L_x}{L_{16}}\right)_{Lj}$$

drawn for a typical prior art classical contra-rotatable turbine (the Ljungstrom turbine) computed on the basis of a vector diagram having congruent velocity triangles from the smallest to the largest stage. It is seen that the power output of the classical turbine is very small in the small diameter stages and progressively increases with the increasing diameter of the stages until it reaches the same relative value as the output of the last stage of the turbine of this invention. The vertical distance (the difference between the respective ordinates) at any stage between these two curves $L_x/L_{16}$ and $$\left(\frac{L_x}{L_{16}}\right)_{Lj}$$

is equivalent to the gain obtained at any given particular stage in the turbine described here and the prior art classical turbine. The curve for the classical turbine has a variation between the ordinates of from 13.5% in the innermost stages of 100% in the outer stage.

As stated previously, the gain in the work obtained from all stages, except the last stage, permits one to reduce the number of the required stages by 50%, or even higher percentage.

The curve $U_x/C_x$ illustrates the variation of the velocity ratio from stage to stage. This stage velocity ratio should be familiar from the classical literature on steam turbines. For pure impulse turbines, this ratio is $$\frac{U_1}{C_1} \simeq .5$$

and for 50-50 reaction turbines (equal expansion in the stator and rotor), it is equal to $$\frac{U_1}{C_1} \simeq 1.0$$

In the new system of the centrifugal radial flow turbines, this ratio is represented by a straight line because it is the direct function of the radius. Although the energy conversion in the two rotors is divided equally as long as they have equal number of stages, the ordinates of this curve vary from approximately .15 to approximately .68. The significance of this ratio resides in the graphical illustration of the change of the velocity vectors $U_x$ and $C_x$ as a function of the radius of the turbine stages increases. The absolute velocity of the fluid, $C_x$, decreases as the radius of the stages increases and the peripheral velocity increases as the radius of the stages increases. Therefore, this ratio must increase with the increase of the stage diameter. The $U_x/C_x$ ratio is a straight line relationship only when the radial velocity $C_r$ is constant and the local Mach number $M_{w'x}$ is also constant. Accordingly, the degree of expansion in the flow channels is adjusted to produce not only the constant local Mach number, but also to produce the linear $U_x/C_x$ relationship. This curve will become slightly convex as viewed from the top of FIG. 19 if the energy conversion per stage is constant.

The additional curve which is also illustrated in FIG. 19 is the ratio of the relative entry $W_x$ and exit $W_x'$ velocities in any stage; i.e., $W_x/W_x'$, which indicates the degree of expansion in the turbine stage channels, from stage to stage. It increases as a function of the radial distance of the stage from the axis of rotation.

The $$\left(\frac{C_x'}{C_1'}\right)^2$$

curve designates the ratio of the exit kinetic energy at any given stage, $x$, divided by the exit kinetic energy of the first rotor stage. The exit kinetic energy of the first rotor stage. The exit kinetic energy of the first turbine or rotor stage is the highest exit kinetic energy in the entire turbine rotor or rotors, and, therefore, this ratio becomes a yardstick for the assimilation of the kinetic energy by the large diameter stages. The curve begins with a high value at the first stage and constantly decreases in value with the increase in the diameter of the stages, which means that the kinetic energy of any preceding stage is being absorbed or converted into work by the succeeding stage at an increasing rate throughout all of the stages of the turbine and not only by a few stages. The ratio finally reaches a value of approximately .38 in the last outermost turbine stage, which means that only 38% of the kinetic energy leaving the first stage is passed out by the last stage into the hood as a transport energy. It should be noted that the kinetic energy of the last rotor stage is further recovered by the exit stator stage before the gases enter the exhaust hood. This additional energy recovery is not indicated in this figure.

FIGS. 20 and 21 are explanatory figures and are used to demonstrate that the reduction in stages and high rate of expansion from the very entry into the first stage or the input stator are obtained without any loss in stage efficiency.

A fluid passing through a stage encounters resistance. This resistance can be divided into basic resistance and stage resistance.

The basic resistance can be once more subdivided into a resistance due to turning of the fluid and into a resistance due to friction within the fluid as well as along the walls of the flow channels. The basic resistance is common to all turbine stages, centrifugal, axial, etc. The mean diameter of an axial flow stage will have only the basic resistance at this diameter of the stage. The basic resistance will grow toward the root and the tip from additional resistances that develop toward the ends of the blades. In the centrifugal flow turbines, the basic resistance will be approximately constant throughout the length and different diameters of the stages and will grow only slightly at the outer stages due to the increase in the resistance produced by the radial wall friction. The centrifugal flow turbine stages, therefore, are inherently more efficient than the axial flow stages.

The resistance to flow reduces kinetic energy of the fluid and this loss in kinetic energy is expressed by the following equation:

$$\frac{{}_{M}C_1^2}{2g}=\frac{{}_{M}C_{1th}^2}{2g}-Mh_1\frac{C_{1th}^2}{2g} \qquad (15)$$

From this:

$$C_1=C_{1th}\sqrt{1-h_1}=\gamma C_{1th}$$

for a stator where $M$=the mass flow in unit time, lb. sec./ft.
$C_1$=actual outflow velocity, ft./sec.
$C_{1th}$=velocity of outflow without losses, ft./sec.
$h_1$=loss coefficient From this equation it also follows that $$\frac{{}_{M}W_2^2}{2g}=\frac{{}_{M}W_{2th}^2}{2g}-Mh_2\frac{W_{2th}^2}{2g}$$

and from this $$W_2=W_{2th}\sqrt{1-h_2}=\psi W_{2th}$$

$\psi_S$=velocity coefficient, $C_1/C_{1th}$ in stator cascades, or
$\psi_R$=velocity coefficient, $W_2/W_{2th}$ in rotor cascades.

It is also clear that the channels with small angles of turning are hightly efficient and that as the turning angle increases, the velocity coefficient decreases. This means that the losses due to turning increase with the increase of the angle of turning. In the described system of expansion, the first stages, having the largest angles of turning, will have the lowest velocity coefficients, while the channels having the largest diameter, in which the turning angles are the smallest, the velocity coefficients are the highest, and therefore, the losses are the smallest.

The second coefficient, representing the friction losses, is shown in FIG. 21. Here the friction coefficient is plotted against the Reynolds' number and again, two curves 2100 and 2101 are drawn. Curve 2100 is for a channel with maximum expansion, and curve 2101 for a channel with no expansion, or a constant pressure channel. The channels used in the disclosed centrifugal flow turbines are all full expansion channels, and, therefore, curves 2000 and 2100 should be used in any comparison. In a centrifugal flow turbine, the Reynolds' numbers of the first stages, with high velocities of flow, are the highest, and, as is shown in FIG. 21, at these values of the Reynolds' numbers, the losses due to friction are the least, approaching zero at these high Reynolds' numbers.

Combined in the above relation, it is seen that the two effects compensate each other, the first stages having a low velocity coefficient and a high friction coefficient, so that the actual velocity coefficient, $\gamma$ or $\psi$, will be of a reasonably high value.

On the other hand, the large diameter stages, where the flow velocities are lower than in the innermost stages, suffer from increased friction losses due to the decrease of the Reynolds' number. The Reynolds' number decreases progressively from the innermost stage to the outermost stage, in spite of the decrease of the kinematic viscosity coefficient. This increase of losses due to friction is, however, compensated for by the progressive increase of the velocity coefficient, $\psi$, in the rotor stages and $\gamma$ in the stator stages, from the first stage to the last stage. The velocity coefficients are plotted in FIG. 20 and the friction coefficient is plotted in FIG. 21. It is at once apparent from even a visual comparison of these diagrams that they are self-compensating, and in actual application of numerical data, it is in general true that the efficiency of each stage is substantially constant from stage to stage. This means that the centrifugal flow stages, operating with constant energy conversion or constant Mach number, are all highly and uniformly efficient.

The compensating effect of the velocity and friction coefficients is a very important factor in this method when applied to the centrifugal flow machines because large energy conversions are obtained in fewer stages without any loss in efficiency. Even if such an expansion program were obtainable with a somewhat decreased efficiency, it still would have been attractive due to the drastic reduction of the number of stages and initial cost of such turbines. That it is possible to realize this method without loss in efficiency enhances the merits of this method still further. The method and high efficiencies can be obtained only when there is a rapid initial expansion; without such an expansion the efficiencies could not be held high. Also, this method of expansion is NOT POSSIBLE in any other known system of turbines. For example, in the prior art Curtis turbines a very high degree of expansion is used in the first stage, but this stator stage is followed by as many as five stages, three rotors and two stator stages, all needed to work out the kinetic energy obtained from the first rotor nozzle. Obviously, this prior art is not only different from the disclosed method but is also far from comparable to it in efficiency, and is in fact, the least efficient turbine known to us and still in use today.

This invention, therefore, discloses a series of turbine structures and the methods of their operation, which produce centrifugal radial flow turbines capable of delivering greater shaft horsepower with a lesser number of stages with a given potential energy of fluid as compared to the radial turbines known to the prior art. Therefore, it is possible to obtain radial flow turbine machines having lower specific weight and higher over-all efficiencies. Since by far the larger cost of any turbine is represented by the number of stages used in the machine for producing the desired horsepower, it follows that the disclosed radial flow machines will be much cheaper than the known radial flow turbines. As mentioned previously, it becomes possible to reduce the number of required stages by approximately 40% in the discussed specific example. Such reduction may be even greater in other machines having other $R_1/R_2$ ratio. It also has been stated in the discussion of these machines that it will enable one to operate the innermost stages of the turbines at lower temperatures, and therefore, the disclosed machines and methods also offer an opportunity to increase the maximum temperature of the operating cycle which, in turn, increases the over-all efficiency of the power plant.

The above results are otbained by introducing an input expansion stator, in the preferred version of the invention, and obtaining on the output side of this stator a maximum absolute velocity $C_1$, which is the greatest absolute velocity in the entire turbine. The parameters of the rotatable stages are then proportioned in the manner described previously. It should be mentioned in this connection that the vectorial diagrams are drawn as closely to scale as possible, and, therefore, such parameters as the absoulte and relative velocities, rates of acceleration in the respective stages, total turning angles, $\theta$, the acceleration component, or the expansion component, $\theta_e$, of this total angle, the coefficient of expansion, the stagger angle, etc., i.e., all of the stage parameters can be computed from the given vector diagrams; therefore, the specification and drawings have complete data for designing turbines of the types disclosed here.

FIG. 22 illustrates the angles used in the description of the radial flow turbine. All of these angles are illustrated in FIG. 22. The total angle of turning, $\theta$, is the angle between the entry velocity and the exit velocity from a given stage. In FIG. 22 it is the angle between $W_1$ and $W_2$ when the illustrated stage 2203 is a rotatable stage, and blades 2200 are the rotor blades. When stage 2203 is a stator, then the total angle of turning is the angle between the absolute entry velocity $C_1$ and absolute exit velocity $C_2$ from stage 2203.

Angle $\theta_\epsilon$ is an expansion angle of turning and is the angle between the exit velocity $W_2$ or $C_2$ and line 2209 in FIG. 22, which represents the magnitude of the angle of approach $\beta_1$. $\beta_1$ is the angle between the radial line 2205 and the entry velocity $C_1$ or $W_1$.

Angle $\theta_\epsilon$ is an angle which is used for indicating the rate of conversion and the degree of acceleration produced in the channel. This angle is being introduced in this specification because the method of operation of the turbine is predicated on the rapid acceleration of the fluid in the first row of blades, where $\theta_\epsilon$ is a large angle, and this first row of blades may be either a stator or a rotor, since the method can be practiced with or without a stator. $\theta_\epsilon$ then decreases in the second row of blades, and it increases again after the second row of blades, becoming again large in the last row of blades.

The angle of stagger is the angle between a chord line and a line perpendicular to the cascade, which is line 2204 in FIG. 22.

Angle of approach $\beta_1$ is the angle between line 2205, perpendicular to the cascade, and either the absolute velocity C, or relative velocity W, at the entry into the stage.

The outgoing angle, or $\beta_2$, is an angle between $C_2$ or $W_2$ and the radial line 2206.

It should be noted here that $\beta$ angles are used for rotors and the same angles become $\alpha$'s when the stages are stators.

*Axial flow machines having substantially constant energy conversion in all stages of the turbine*

The constant energy conversion and constant exit Mach number principles are also applicable to the axial flow machines. When axial flow machines use steam as a working fluid, it is possible to create supercritical pressure in steam because of one's ability to create supercritical pressures with the air of water pumps. Under such circumstances, fluid has extremely high potential energy and steam turbines generally are then known as supercritical pressure turbines which receive energy directly from the superheater, and these supercritical turbines then dischage into medium and low pressure turbines, or turbine, the medium and low pressure expansion being generally obtained in two separate rotors, so that full expansion is obtained in three rotors.

When constant energy conversion and constant exit Mach number principles are applied to the axial flow machines then such expansion, from the supercritical to the condensor pressure, can be obtained in two rotors, such as those illustrated in FIGS. 23 and 25. The construction of these machines, insofar as the general construction of the rotors and of the frame is concerned, is identical to that of the known axial flow machines, except that all gaps are now narrow gaps in this case, while in the known machines the gaps are narrow at the entry and wide at the exit from the rotors. The blading is also different. Therefore, the general construction requires only a very brief description. The blading and the gaps of these machines, therefore, differs markedly in the constant energy conversion or constant Mach number machines and such blading and gaps are illustrated in FIG. 27, which will be described later.

Since the blading and the gaps are different, it follows that the velocity vector diagrams also differ from the velocity vector diagrams of the prior art.

As in connection with the radial centrifugal flow turbines, it is also possible to reduce drastically the number of stages used in the axial flow machines. For this reason, it becomes possible to obtain total expansion only in two rotors, however high is the supercritical pressure and temperature, thus reducing the cost not only of the machines, but also of the entire power plant, since the length of the power plant is reduced in direct proportion to the reduction in the number of stages used for obtaining total expansion.

Referring to FIG. 23, a turbine cylinder 2300 includes an input chest 2301, a stator 2302, and eight rotatable stages 2303–2310, the last stage 2310 discharging into a diffuser, or compression, stage 2312 which, in turn, discharges into an exhaust hood 2313. The cylinder 2300 is provided with seven stators 2314–2320 and interstage and shaft seals, the shaft of the rotor being illustrated at 2321. FIG. 23 illustrates the supercritical pressure turbine, and, as is known to the prior art, such turbines may have either constant diameter rotor or a variable diameter rotor, in which case the diameter of the stages increases slightly from the first stage to the last stage. The constant energy conversion or constant Mach number are applicable to any type of construction, i.e., irrespective of the fact whether the rotor is a constant diameter or a variable diameter rotor.

The variable diameter rotor is illustrated in FIG. 25, the rotor being illustrated at 2500, the cylinder at 2501, the input stator at 2502, the first and the last rotatable stages being stages 2504 and 2503, respectively. This turbine may be either a steam turbine or a gas turbine because it is a variable diameter machine. There are seven rotatable stages illustrated in FIG. 25 and six stators, or turning stages, such as the first turning stage 2505. Because of the large increase in the volume of the fluid, it becomes necessary to increase the diameter of the rotor in the manner indicated by a median line 2506. FIG. 25 illustrates, in this case, the medium and low pressure rotors combined in a single machine and mounted on a single shaft 2504, thus eliminating the third machine altogether. It should be noted here that it is also possible to combine the first and second rotors when capacity of the power plant is high and the third rotor must discharge large amounts of fluid.

As in the case of the turbine illustrated in FIG. 23, the turbine illustrated in FIG. 25, insofar as the general arrangement of the basic elements is concerned, does not differ from the prior art turbines. The difference resides in the blading and the energy conversion obtained in the stages of the machine and in the gaps, which are now all narrow gaps, while in the known machines the gaps are narrow at the entry into the rotors and are wide at the exits. There is also a difference in the configuration of the turning stages, and, therefore, insofar as the staging is concerned, the configuration of the stator as well as the rotor blading differs markedly from the prior art and, accordingly, the absolute and relative velocities also differ from the prior art.

Referring now to FIG. 24, which illustrates the velocity vector diagram for the supercritical pressure turbine illustrated in FIG. 23, fluid enters stator 2302 at an axial flow velocity $C_0$, which is the velocity of the fluid in the input chest 2301. The fluid is expanded to a high subsonic or supersonic velocity $C_1$ having a $U/C_1$ ratio between .25 and .4, the preferred ratio being in the order of .3, which means that the maximum turning angle of the input stator 2302 may be in the order of 110°–120°. Such turning angle can be achieved without any separation because of the high potential energy and the expansion of the fluid. Fluid enters the first rotor 2303 at a relative velocity $W_1$. The velocity vectors $C_1$ and, $W_1$ form angles $\alpha$, and, $\beta$, respectively, with an axial flow line 2400. These angles, as well as angles $\alpha_2$ and $\beta_2$ for the absolute velocity $C_2$ and relative velocity $W_2$ have magnitudes within the limits of the absolute velocity $C_1$ and relative velocity $W_1$.

In the preferred version, illustrated in FIG. 24, $C_1=W_2$; $C_3=W_4 \ldots C_{n-1}=W_n$. In this manner optimun Mach numbers are obtained.

The remaining portion of the vector diagram should be apparent to those skilled in the art. Fluid leaves the first rotor stage 2303 at high absolute velocity $C_2$, and it enters the stator 2314 at the absolute velocity $C_2$. It leaves stator 2314 at an absolute velocity $C_3$, which is larger than velocity $C_2$. The ratio of the absolute entry velocities into the stators to the absolute exit velocities from the stators is a constant ratio and has a range from .5 to .8, this ratio being constant for all the stators for the turbine illustrated in FIG. 23.

The ratio of the relative entry velocities into the rotors to the relative exit velocities from the rotors, i.e. $W_1/W_2$, etc., has a magnitude range from .5 to .8 and is also constant for the machine illustrated in FIG. 23. The expansion continues in the manner illustrated in FIG. 24, the magnitudes of the absolute velocities at the exit from, which are also the absolute entry velocities into the rotors, the stators $C_1, C_3 \ldots C_{n-1}$ being constant and the magnitudes of the absolute exit velocities from the rotors $C_2 \ldots C_{n-2}, C_n$ being also constant.

The relative velocities at the exit from the rotors, which are $W_2 \ldots W_{n-2}, W_n$ are also constant and this is also true of $W_1, W_3 \ldots W_{n-1}$, which are the relative entry velocities into the rotors. Therefore, lines 2401, 2402, 2403, and 2404 are parallel lines and they are also parallel to the axial flow line 2400.

As also indicated in the legend of FIG. 24, $$C_n \cong W_{n+1} = \text{constant} \qquad (16)$$

which means that the absolute entry velocities into the rotors are substantially equal to the relative exit velocities from the same rotors throughout the entire turbine.

Fluid leaves the last rotor stage 2310 at an absolute velocity $C_n$, and it enters stator and diffuser 2312 at this absolute velocity. In stator 2312, this velocity is reduced to the axial flow velocity $C_{n+1}$, and, therefore, the entry velociy $C_n$ is turned in stator 2312 by an angle $\theta_{n+1}$ to produce diffusion in stator 2312. The last rotor stage 2310 discharges into a gap 2330 which has a lower pressure than the pressure which would be in this gap without the stator 2312. This pressure in gap 2330 is lower than the pressure in the hood 2313. This has been described already in connection with the radial flow machines, and, therefore, need not be repeated here. FIG. 24 corresponds to the previously described FIG. 35 and, therefore, the earlier comparison of FIGS. 35 and 34 also applies to FIG. 24.

No steam bleeding is illustrated in FIGS. 23 or 25, because such techniques are known and need not be described here.

In the light of the discussion of the vector diagrams illustrated in FIGS. 24 and 35, it should be apparent to those skilled in the art that the difference that exists between prior art (FIG. 34) and what is illustrated in FIGS. 24 and 35 resides in the fact that the vector velocity triangle, such as $C_2$—$W_2$—U and, in general, all velocity triangles to the right of the axial flow line 2400 in FIG. 24, are triangles in which the absolute velocity $C_2$ and relative velocity $W_2$ are much greater than in the prior art, which is achieved by allowing the fluid to travel through the rotors at much higher velocities than in the prior art. Therefore, in the disclosed machines, the magnitude of all velocities through the stators as well as the rotors have the same order of magnitude, while in the prior art the flow velocities are low at the entry into stators, than they are increased in the stators, leave the stators as high velocities, enter the rotors at high velocities, decrease in the rotors and leave the rotors with low velocities. Thus, the basic concept of the prior art turbines is to consider a stator-rotor combination as a single independent unit, and thus start expansion and acceleration of the fluid all over again through the stator of the next downstream unit. In the disclosed turbines and the methods, the entire turbine is considered as a unit, with the result that all velocities and the kinetic energy remain constant in the contro-rotating turbines and substantially constant in the single rotation machines. Also, the total momentum is being continuously regenerated while part of it is being simultaneously converted into work and, therefore, the total momentum remains substantially constant. In the contra-rotating machines it is strictly constant for all practical purposes (see line 3706 in FIG. 37) and it fluctuates slightly in the single rotation machines (see Curve 3707 in FIG. 37). It can be made constant even in the single rotation machines if the Mach numbers of the absolute exit velocities from the stators ($C_1, C_3, \ldots C_{n-1}$) are made lower than the Mach numbers of the relative exit velocities form the rotors ($W_2', W_4 \ldots W_n$). The disadvantage of the above is that the single rotation turbine of this type will require more stages than the turbine using the vector diagram of FIG. 35. Also, the Mach numbers $M_{C_1}, M_{C_3} \ldots M_{C_{n-1}}$ will become needlessly low, and lower than $M_{W_2}, M_{W_4} \ldots M_{W_n}$. The best operation is obtained when $$M_{C_1}=M_{C_3}=M_{C_{n-1}}=M_{W_2}=M_{W_4}=M_{W_n} \qquad (17)$$

for FIGS. 23 and 24.

Moreover, as stated earlier even the single rotation turbines are transformed into the high torque, high momentum turbines. Such rapid energy conversion produces greater pressure drop across the stator stages as well as across the rotors and, therefore, all interstage seals must be designed to counteract effectively such high pressure drops. Similarly, the axial pressure on the rotor and stator discs now are high and, therefore, they must be designed to withstand such high lateral thrust.

The velocity vector diagram of the type illustrated in FIG. 24 also produces other differences in the turbine illustrated in FIG. 23. Since the velocities and the turning angles are substantially the same in stators as well as in rotors, the axial width of the stators as well as the rotors is substantially the same, while in the prior art, the stators are always axially wide and the rotors are always narrow. Also, while in the prior art, the gaps between the stators and rotors are always narrow, the gaps between the rotors and stators are always wide. In the disclosed machine all the gaps are narrow and they are designed to produce, as much as possible laminar flow, so as to have minimum gap losses. This is also true of the prior art gaps on the downstream side of the stators and the upstream part of the rotor, but the gaps on the downstream side of the rotors and on the input side of the stators are wide gaps for the purpose of reducing the kinetic energy of the fluid, and, therefore, these wide gaps introduce high turbulence losses in the prior art machines. Such losses are not present in the disclosed machines. From the discussion of the machines disclosed in FIG. 23, it also could be stated by the way of summary that the entire machine is now analyzed and designed as a unit and not as an assembly of different stator-rotor units which is the technique used in the prior art.

The cross-sectional view of the blading suitable for the stages of the machine illustrated in FIG. 23 will be described later in connection with the description of FIG. 27.

FIGURE 26 illustrates the velocity vector diagram for the variable diameter turbine illustrated in FIG. 25. Fluid enters the stator at a low velocity $C_0$, and leaves it at a high absolute velocity $C_1$. It enters the first stage at a relative velocity $W_1$ and leaves the first stage at a relative velocity $W_2$, etc. In this case, all absolute as well as all relative velocities decrease from the first stage to the last exit stage, as the diameter of the stages increases, in order to retain the absolute exit velocities and the relative entry velocities into the rotors within subsonic Mach numbers in spite of the increases in the peripheral velocities U's. It also follows from FIG. 26 that the velocities of the fluid through the rotors as well as the stators have the same magnitudes, since the left as well as the right sides of the diagram are symmetrical with respect to the radial flow line 2600. The turning angle decreases from the first stage to the last stage because of the increased rate of expansion from the first stage to the last stage. As indicated in FIG. 26, the ratio $U/C$ is in the order of .384 in the first stage and .909 in the last stage. This ratio, in general, would have maximum and minimum limits from about .25 for the first stage to about .92 for the last stage. In the standard turbines this $U/C$ ratio generally is in the order of from .88 to .92.

The $W_1/W_2$ ratio is in the order of .6 for the first stage and $W_{n1}/W_{n2}$ is in the order of .3 for the turbine illustrated in FIG. 26. The maximum and minimum limits of this ratio would be in the order of .75 to .2. The dotted lines 2601–2612 indicate the limits of variations which can exist in the construction of the vector diagram for the machine illustrated in FIG. 25. Lines 2602, 2605, 2608, and 2611 are straight lines, while the remaining lines are concave lines when viewed in the direction from the straight lines.

FIGURE 27 illustrates the cross-sectional view of typical blading for the turbines illustrated in FIGS. 23 and 25. The input stator is stator 2700. The rotatable stages are stages 2701, 2703, 2705, 2707, 2709, 2711, and 2713, and the stators are 2702, 2704, 2706, 2708, 2710, and 2712. Only the first gap 2714 and the second gap 2715 are actually numbered in FIG. 27, since all the remaining gaps are identical to the gaps 2714 and 2715, respectively, and, therefore, need no additional individual discussion. As stated previously, all of these gaps are narrow gaps, while in the prior art machines, gap 2714 is a narrow gap and gap 2715 is a wide gap. A blading 2716 in the input stator is not new: it accelerates fluid from a low velocity $C_0$ to a high exit velocity $C_1$ which takes place in the high energy conversion turbines disclosed here, as well as in the prior art turbines. The gap 2714 is identical to the gap of the prior art, and the blading, such as 2717, is designed to produce a flow channel 2718 having a larger cross-sectional area on the input side 2719 than on the output side 2720, and, therefore, it is an acceleration channel. The blading of stator 2702 is comparable to the blading of the rotor stage 2701, the blades again forming acceleration channel 2721 which is comparable to the acceleration channel 2718.

As stated previously, all interstage gaps are narrow gaps, which is a very important and fundamental change. It will be discussed more in detail later.

There is no need to describe FIG. 27 any further, because the nature of the blading and the nature of the channels should be apparent to those skilled in the art from what is illustrated in FIG. 27, namely, all channels are acceleration channels. The upstream rotors and stators are high momentum rows of blades, the absolute and the tangential momentum progressively decreasing downstream until they are at their minimum in the last rotor. Similarly, the kinetic energy in the interstage gaps is maximum at the first gap and is minimum at the last gap. In the prior art the kinetic energy is maximum on the downstream side of the stator and minimum on the downstream side of the rotor at all diameters and throughout the entire machine with the kinetic energy increasing with the increase in the radius of the stages.

The additional salient features of the blading and of the operation of the high energy conversion axial flow machines is summarized in the table given below which, by way of comparison, also gives the same information for the axial flow machines known to the most relevant prior art.

| High Energy Conversion Axial Flow Turbine | Conventional Axial Flow Impulse Turbine (The Best In Terms of Energy Conversion) |
|---|---|
| FIRST STATOR | |
| Same as conventional | Has acceleration stator. |
| TURNING ANGLE AND ACCELERATION | |
| Same | Same. |
| FIRST GAP | |
| Narrow, conventional. Axial velocity is low. | Narrow. Axial velocity is low. |
| FIRST ROTATABLE STAGE | |
| A. Accelerating channel for low expansion head at high velocity.<br>B. High turning angle, 90°–140°<br>C. Blade tips sealed on outer periphery.<br>D. Converging expansion channels between blades.<br>E. Entry Cu is high<br>F. High leaving absolute velocity at exit.<br>G. High turning angle<br>H. Exit Cu is high | A. Constant velocity channel for low velocity flow. Expansion head is zero.<br>B. High turning angle, 90°–140°.<br>C. Blade tips sealed minimally. (Shrouded.)<br>D. Constant width, non-expansion channels between blades.<br>E. Entry Cu is high.<br>F. Low leaving absolute velocity at exit.<br>G. High turning angle.<br>H. Exit Cu is zero. |
| SECOND GAP | |
| (Between the first rotatable stage and 2nd stator). Narrow, of the same order of magnitude as the 1st gap. Axial velocity is low. | Wide, often many times wider than the 1st gap, to provide space for destruction of kinetic energy of the fluid leaving from the 1st rotor. Axial velocity is low. |

| | |
|---|---|
| **SECOND STATOR** | |
| Closely similar to the 1st rotor | Same as first stator but entirely different from the first rotor (angle of turning, width of channel, and acceleration channel vs. a mere turning channel). |
| A. Expansion flow channel converging from entry to exit.<br>B. Low expansion head at high velocity. Expansion head greater than in the 1st rotor.<br>C. Large turning angle, but smaller than in the 1st rotor.<br>D. Exit velocity of the same magnitude as the exit velocity from the 1st stator and the same as the relative exit velocity from the 1st rotor. | A. Expansion flow channel converging from entry to exit.<br>B. High expansion head to accelerate the working fluid from low to high velocity.<br>C. Small turning angle.<br>D. Absolute exit velocity of the same order of magnitude as the absolute exit velocity from the first stator. |
| **THIRD GAP** | |
| Narrow, of the same order of width as the 1st and 2nd gaps. Axial velocity is low. | Narrow. Axial velocity is low. |
| **SECOND ROTOR** | |
| Similar to the 1st rotor and the 2nd stator, but with increased expansion head compared to the 1st rotor and the 2nd stator.<br>A. Expansion flow channel converging from entry to exit.<br>B. Expansion head greater than in the 2nd stator.<br>C. Relative entry velocity lower than into the 1st rotor.<br>D. Relative exit velocity of the same order of magnitude as the absolute exit velocity from the 2nd stator.<br>E. Turning angle smaller than in the 2nd stator.<br>F. Smaller turning angle than in the 1st rotor.<br>G. Lower leaving absolute velocity than from the 1st rotor. | Identical to the 1st rotor. It is only a turning channel. |
| H. Exit Cu is high | H. Exit Cu is zero, or nearly zero. |
| **FOURTH GAP** | |
| Narrow, of the same order of magnitude of width as previous gaps. Axial velocity is low. From here on, the process is repetitive, with— | Wide. Axial velocity is low. |
| A. Expansion heads in all rotors and stators progressively increasing toward the last rotor. | A. Expansion heads are high in stators and zero in rotors. |
| B. All succeeding gaps having the same width. | B. Velocity changes are great, from high absolute exit velocity from all stators to low exit velocity from all rotors. |
| C. All adjacent rotors and stators having closely similar blades. | C. Absolute velocity between all stators and rotors is very high. |
| D. All rotors and stators having expansion channels. | D. Absolute velocity between all rotors and stators is very low. |
| E. Expansion in all rotors and stators increasing progressively downstream toward the last rotor.<br>F. Expansion in any immediately adjacent rotors and stators is comparable in magnitude.<br>G. Velocities between all stators and rotors are high.<br>H. Velocities between all rotors and stators are changing from high between the first rotor and second stator to low at the exit from the last rotor. | |
| I. All rotors are high torque, high momentum rotors. | I. All rotors are low momentum, low torque rotors, equal reaction rotors having even lower torque than the impulse rotors. |
| J. All dynamic parameters can be made constant, non-fluctuating, and only very moderately fluctuating in the turbines having maximum energy conversions per stage. | J. All dynamic parameters have very wide fluctuations. |
| K. All rows of blades have high efficiency because of expansion in all rows. | K. Only stators have high efficiency, rotors have lower efficiency due to absence of expansion. |
| L. For a given heat drop approx. 40% fewer stages than in conventional machines. | |

FIGURE 28 illustrates a typical diagram of energy distribution in an equal reactions a 50—50 axial flow turbine as a function of the velocity ratio $U/C$ which is abscissa, the efficiency $\eta$ being the ordinate. In FIG. 28, the $v/C$ ratio is plotted for the case in which C is an independent variable, while $u$ remains constant. This relationship is not the one which is directly applicable to the high energy conversion turbines, either single or double rotation, but it is the only one for which the loss distribution is known. This diagram applies to the known axial flow turbines but only to a limited extent to the axial flow turbines disclosed here. The quantities which are plotted in FIG. 28 from bottom to top are: useful output, leakage loss, ventilation and boundary losses, friction resistant losses, and kinetic energy of minimum at line 2801, and it increases again when the leaving velocity. Line 2800 designates the position of the first rotor stage 2701 in FIG. 28. The solid line 2801 indicates the position of the last rotor stage 2713 in FIG. 28. The remainder of the energy between line 2802 and line 2803 is a shaded area which indicates the kinetic energy of the leaving velocity. It is maximum at the entry to the turbine at the zero point, and it is minimum at line 2801, and it decreases again when the ratio $U/C$ is greater than 1. The 1.0 value of this ratio is indicated by line 2805 in FIG. 28.

The reason for including FIG. 28 in this application is for the purpose of indicating the fact that while the prior art turbines are designed for U/C ratio approaching 1, (line 2801 is quite close to line 2805) the high energy conversion turbines disclosed here are designed for a much lower U/C ratio for the high pressure, or the upstream, stages and it approaches the same U/C ratio$\cong$1 in the very last stage. The reason for designing all stages of the prior art turbines with the U/C ratio approaching 1.0 is due to the fact that the gaps are wide at the exit from the rotors and, therefore, it becomes necessary to decrease the kinetic energy losses, i.e., fluid must leave rotors at low velocity. If there were high kinetic energy in the wide gaps, it would merely increase the losses present in the wide gaps because the kinetic energy is not recoverable in the machines of the prior art. This area is designated by the shaded area 2810, which, as indicated in FIG. 28, has minimum ordinate at the .9–1.0 ratio of U/C. An additional reason for designing the prior art machines in the above manner is due to the fact that they all have wide gaps on the downstream side of the rotors, and, since it is impossible to approach the laminar flow in such wide gaps, it is obvious that the machines of this type must have extremely low kinetic energy in such gaps in order to reduce turbulence losses. No limitation exists in the high energy conversion machines disclosed here because the gaps are all narrow gaps and, therefore, even though high kinetic energy does appear in such gaps as, for instance, at the exit from the first rotor stage 2701, which is indicated by line 2800 in FIG. 28, the kinetic energy of the fluid on the downstream side of stage 2701 is maximum as indicated by the dimensional line 2806. However, due to the fact that gap 2715 is now a narrow gap and, therefore, laminar flow is approachable, this high kinetic energy is merely passed along to the next stator 2702 in the form of kinetic energy with a minimum loss in the gap, and stator 2702 then passes this energy along to the next rotor 2703 and, in addition, increases the amount of total kinetic energy in its acceleration channel 2721.

It is a matter of great importance to consider now whether it is more advantageous to have the stages designed and used in the region of line 2800 rather than line 2805. The efficiency of the stages in the high energy conversion machines is equal to the $$\eta=\frac{(\text{Length of line 2800})}{(\text{Length of lines 2800+2807})} \qquad (15)$$

Such definition of the stage efficiency is possible in the high energy conversion machines because the kinetic energy represented by line 2806 in this case is recoverable and, therefore, need not be charged as a loss against the stage under consideration. From FIG. 28 it follows that the stages will have maximum efficiency if they are designed with a minimum U/C ratio. It is, of course, impossible to have as low U/C ratio as, say, .384 indicated by line 2800 for all stages since, in order to obtain rapid conversion of energy with a minimum number of stages, it becomes necessary to increase the rate of expansion as one progresses from the first stage to the last stage. Under such circumstances, the U/C ratio becomes progressively higher as one progresses from the first stage to the last stage. It is to be noted here that it would appear from the above discussion that all stages should be designed with U/C ratio as low as possible in the vicinity of line 2800. This is indeed the case insofar as the constant diameter turbines are concerned, such as the illustrated in FIG. 23. However, with the variable diameter turbines, such as those illustrated in FIG. 25, it would be also possible to design all stages in the region of line 2800, in which case the intermediate stages, beginning with stages 2705, 2706, and 2707, will become supersonic stages, and all the remaining downstream stages also will become supersonic, and operation and design of supersonic stages is more difficult than operation and design of the subsonic stages. A supersonic turbine would also produce a longer turbine with a rather critical speed operation. Therefore, from an operational point of view, in order to make the turbine subsonic from the first stage 2701 down to the very last stage 2713, it becomes necessary to sacrifice the stage efficiency by gradually migrating from line 2800 toward line 2801.

FIGURE 29 illustrates two curves where stage numbers appear along the abscissa and U/C and $W_1/W_2$ ratios appear along the ordinate. The U/C curve indicates that this ratio increases rather rapidly with the increase in the diameter, this curve being plotted for the increasing diameter turbine illustrated in FIG. 25. Line 2900 also illustrates the U/C ratio for the prior art turbines and, as indicated by line 2900, it is a straight line ratio, which follows from FIG. 28, because all of the stages are designed so as to have this ratio in the vicinity of line 2801 shown in FIG. 28.

The second curve is the ratio of two relative velocities at the entry and at the exit of any given rotor, this ratio decreasing from the first stage to the last stage in the high energy machines, while in the prior art, it is a straight line parallel to the abscissa and having the ordinate value of below .5. This curve indicates the fact that the kinetic energies decrease as one progresses from the first stage to the last stage, which is also in agreement with the prior discussion of the momentum.

From the discussion of FIGS. 28 and 29, it follows that the high energy conversion staging does not result in the staging which has lower efficiency than the prior art staging. Quite on the contrary, it produces a higher efficiency staging due to the discussion which has been given previously in connection with the discussion of FIG. 28.

Therefore, what is accomplished with the machines disclosed here is the creation of (1) The machines having a markedly smaller number of stages than the known machines, such as stage reductions in the order of 50% (maximum), and (2) Creation of staging which is more efficient than the staging of the prior art machines; such increases in efficiency are obtained not only because of the use of a more advantageous U/C ratio discussed previously in connection with FIG. 28, but also because of the drastic reduction in the number of stages and thus reduction of the unavoidable losses which are produced by the components of the turbine, much as stators as well as rotors, including windage losses of discs, leakages, etc.

FIGURE 30 relates to the radial flow contra-rotatable machines, and FIG. 31 relates to the single rotation axial flow machine. The abscissa in both curves indicates the stage numbers and the ordinate indicates a non-dimensional torque factor. In FIG. 30 the upper curve is for the high energy radial flow contra-rotatable turbines and this curve is compared with the torque curve for the Ljungstrom radial flow contra-rotatable turbines, which are the only radial flow turbines now in existence. FIG. 30 indicates that the high energy turbine is a high torque turbine which is the logical concomitant of the reduction of stages and rapid energy conversion in the high pressure stages. Accordingly, all of the stages now become high torque stages, which is not the case in the Ljungstrom turbines nor the axial flow turbines. (See FIG. 31.) It is especially desirable to have a high torque turbine with a minimum number of stages for vehicular and ship propulsion, although, of course, it is also desirable in any power plant.

As to FIG. 31, it also illustrates that the axial flow machines now also become high torque machines, or at least higher torque machines than the prior art axial flow turbines. If the axial flow machines are made contra-rotatable in the same manner as the radial flow machines illustrated in FIG. 30, then the difference between the two torque curves for the axial flow machines becomes comparable to the differences indicated in FIG. 30.

From the discussion of FIGS. 30 and 31, it also follows that the disclosed machines, whether of radial or axial flow type, enable one to operate the machines at lower speeds for the same outputs and with the same number of stages as prior art turbines. Thus, in this variation of the invention, the number of stages becomes the same in the disclosed machines as in the prior art machines, but the advantage of the disclosed method is in utilizing the lower speed of the rotors, which enables one to have simpler gear reduction systems.

Before concluding the discussion of the axial flow machines, it should be stated here that, although none of the figures disclose contra-rotatable axial flow machines, such machines are known to the prior art and, therefore, need no special illustration. As to the blading of such machines, it would be identical to the blading illustrated in FIG. 27, except that all stages become rotor stages, except for the input stator 2700.

What I claim is:

1. A turbine having a plurality of rotatable stages including the first and the last rotatable stages, all of said stages having a large and decreasing total angle of turning, $\theta$, from the first stage to the last stage and having converging acceleration flow channels and all interstage gaps of substantially constant width, said large total angle of turning and the degree of convergence being proportioned to produce $C'_{ux}$ greater than $U_x$, where $C'_{ux}$ is a peripheral component of an absolute velocity $C'_x$ of the fluid at the exit from any one given rotatable stage X, and $U_x$ is the mean peripheral velocity of said given stage.

2. The turbine as defined in claim 1 in which adjacent stages have substantially the same geometries, including their widths, but opposite turning angles.

3. The turbine as defined in claim 1 in which said turbine has an input stator and an output stator.

4. The turbine as defined in claim 1 in which said turbine is a contra-rotatable turbine having two rotors.

5. The turbine as defined in claim 1 in which said turbine is a single rotation turbine.

6. The turbine as defined in claim 1 in which the degree of convergence of the flow channels increases from the first stage to the last stage.

7. The turbine as defined in claim 1 in which the flow channels and their turning angles, rates of the flow channel convergence, the total angle of turning and their angles of stagger are proportioned to produce the rates of expansion, expansion heads and the directions of flow of the working fluid in each rotatable stage to obtain approximately constant rates of energy conversion in each rotatable stage, from the first to the last stage.

8. The turbine as defined in claim 1 in which the value of $\theta$ for the first stage is between 90° and 140°, and the value of $\theta$ for the last stage is between 50° and 70°.

9. The turbine as defined in claim 1 which also includes a hood, an output diffusion stator between said last stage and said hood, said output stator having a plurality of cambered blades forming cambered, diverging diffusion flow channels for converting the kinetic energy of the working fluid, entering said diffusion stator, into potential energy and creating a fluid pressure lower than the hood pressure at an interstage gap between said last stage and said output stator for increasing the output of the last stage.

10. The turbine as defined in claim 1 in which the flow channels and their turning angles, rates of the flow channels convergence and their angles of stagger are proportioned to produce substantially constant exit Mach numbers at the exit from all rotatable stages.

11. The turbine as defined in claim 1 in which said turning angles and rates of divergence are proportioned to produce a continuously increasing $U/C_u$ ratio from the first stage to the last stage, where U is the peripheral velocity of the stage under consideration and $C_u$ is the peripheral component of the absolute velocity of the fluid at the entry into the same stage.

12. The turbine as defined in claim 1 in which the stage parameters specified in said claim 1 are proportioned to produce energy conversions in the individual stages which are within the limits of $\pm10\%$ of the magnitude of the energy conversion of any other stage.

13. The turbine as defined in claim 1 in which said turbine is a radial centrifugal flow turbine.

14. The turbine as defined in claim 1 in which said turbine is an axial flow turbine.

15. A centrifugal flow turbine for converting the energies of a working fluid into mechanical work, said turbine having an input expansion stator having two radial side-walls and a plurality of cambered blades mounted between said side-walls, and converging flow channels defined by said two side-walls and adjacent blades, a plurality of centrifugal flow rotatable stages also having centrifugal flow channels, said rotatable stages including the first stage and the last stage, said input stator having a total angle of turning and rate of convergence to discharge said fluid from said stator at an absolute velocity $C_1$, said velocity $C_1$ being the maximum absolute velocity in said turbine, and said rotatable stages having total angles of turning decreasing and rates of convergence of their respective flow channels increasing from the first stage to the last stage.

16. The turbine as defined in claim 15 in which the flow channels of the rotatable stages, and their turning angles and the rates of convergence are proportioned to produce substantially constant rates of energy conversion from the first stage to the last stage.

17. The turbine as defined in claim 15 in which the angles of turning and rates of convergence of the rotatable flow channels are proportioned to produce substantially constant exit Mach numbers in all of said rotatable stages.

18. The turbine as defined in claim 15 in which the flow channels of said input stator are supersonic nozzles.

19. The turbine as defined in claim 15 in which the flow channels of the rotatable stages are supersonic flow channels.

20. A centrifugal flow turbine comprising an input duct having an axial flow portion and a radial flow portion, a centrifugal radial flow expansion stator at the discharge end of the radial portion of said duct, a first rotatable stage having a plurality of cambered blades surrounding said stator, a first side-disc connected to one side of said blades, additional turbine stages mounted on and supported by said first side-disc, said first side-disc, said first rotatable stage and said additional stages constituting a first set of turbine stages and a first rotor of said turbine, a first shaft connected to and supporting the other side of said blades, whereby the first side-disc is supported on said first shaft through the blades of said first stage, a second shaft surrounding said first shaft, a second side-disc connected to said second shaft, and a second set of turbine stages mounted on said second side-disc, the stages of the first set intermeshing the stages of the second set.

21. The turbine as defined in claim 20 in which said stator includes a plurality of hollow cambered blades, the blades of said first stage being also hollow blades, a source of cooling fluid, and duct means for conveying said fluid through the blades of said first stage and the blades of said stator and then discharging said fluid into said input duct.

22. A radial centrifugal flow turbine comprising a stationary central input duct for delivering working fluid to said turbine, a centrifugal flow input expansion stator at the downstream end of said duct, a first rotatable centrifugal flow turbine stage surrounding said input stator and receiving said fluid directly from said input stator, said first stage having a plurality of cambered blades, first and second concentric shafts, said first shaft being an outer shaft and said second shaft being an inner shaft, a first rotor having a first side-disc and a plurality of centrifugal flow turbine stages all mounted on said first side-disc and rotatable in one direction, said first side-disc being connected to said first shaft, a second rotor having a second side-disc and a plurality of turbine stages, including said first stage, all mounted on said second side-disc and rotatable in the opposite direction, the blades of said first stage interconnecting said second side-disc and said second shaft, said second shaft lying outside the inner boundaries of said stationary central duct and said duct being free of any rotatable components of said turbine.

23. A radial centrifugal turbine comprising a centrifugal flow channel including an inner expansion stator at the entry into said channel for accelerating a working fluid at the exit from said duct and said stator, a first rotor having a plurality of turbine stages including the last rotatable turbine stage, a second rotor having a plurality of turbine stages, the turbine stages of the first rotor interleaving the turbine stages of the second rotor, said first rotor including first and second side-discs lying on the opposite sides of said radial flow channel, with the turbine stages of said first rotor being mounted on said first side-disc, said first and second side-discs being connected to each other through a blading of said last rotatable turbine stage of the first rotor; a first hollow, outer shaft for rotatively supporting said first rotor, said first shaft being connected to said second side-disc, a second shaft concentric with and being surrounded by said first shaft, said second shaft supporting said second rotor, a third side-disc supporting all of the turbine stages of the second rotor and being mounted on said second shaft, said third side-disc being positioned along and adjacent to the inner side of said second side-disc, and said shafts and connections between said shafts and said rotors lying outside the inner boundaries of said radial flow channel, with the exception of said last turbine stage.

24. A radial flow centrifugal turbine including at least one rotor having a first rotatable stage, having a plurality of hollow cambered blades, an input stator discharging into said first stage and having a plurality of cambered hollow blades, a source of gaseous cooling fluid, and means for conveying said cooling fluid to and through the hollow blades of said first rotatable stage and through the hollow blades of said input stator and then discharging said fluid on the input, or upstream side, of said input stator.

25. A radial flow centrifugal turbine comprising a single radial flow channel including a stationary expansion stator at the entry into said turbine, first and second side-discs and first and second sets of rotatable intermeshing contra-rotatable turbine stages mounted on said first and second side-discs, respectively, and first and second concentric shafts connected to said first and second side-discs, respectively; said first set of stages including the first rotatable stage of said turbine, said first side-disc being located on one side of said channel and said second side-disc being located on the opposite side of said channel, and a plurality of cambered blades constituting a part of said first stage, said first side-disc being connected to said first shaft through the blades of said first stage.

26. A centrifugal radial flow turbine including a first rotor having a first set of rotatable centrifugal flow turbine stages, and a second rotor having a second set of rotatable centrifugal flow turbine stages, the stages of the second set intermeshing the stages of the first set, an input stator, all stages, including said stator, having converging, acceleration flow-channels, said stages having large total angles of turning, the convergence of said flow-channels increasing from the first stage to the last stage at a rate to make the degree of expansion of a working fluid through any given stage increase as a substantially linear function of the radial distance of said given stage from the axis of rotation, and the total angle of turning of the respective stages decreasing from the first stage to the last stage, the convergence and the angle of turning being proportioned to produce energy conversions in the individual stages of said turbine which are within the limits of ±10% of the magnitude of the energy conversion of any other given stage.

27. A method of converting available energies of a working fluid into mechanical work with the aid of a turbine having a plurality of rotatable stages, including first, second, and last stages, said method including the steps of discharging said fluid at the exit from the first rotatable stage with an absolute velocity $C_2$ having a peripheral component $C_{u_2}$ which is greater than the mean peripheral velocity of the first stage, introducing said fluid to the second stage at an absolute velocity $C_3$ having at least the same order of magnitude as $C_2$ and a peripheral component $C_{u_3}$ of at least the same order of magnitude as $C_{u_2}$, and thereafter continuing the expansion of said fluid through the remaining stages of said turbine in substantially the same manner by adjusting all absolute and relative exit and entry velocities from and into rotatable stages so as to produce substantially constant and high level energy conversions from at least, and including, the second rotatable stage of said turbine to the last rotatable stage of said turbine.

28. The method as defined in claim 27 which also includes the step of expanding said fluid in said first stage to obtain a maximum absolute exit velocity $C_2$ at the exit from said first stage.

29. The method as defined in claim 27 which includes the steps of accelerating said fluid to a maximum absolute velocity $C_1$ prior to and at the entry into said first stage, and converting said available energies into work in said first stage at substantially the same rate as in any other stage.

30. A method of converting potential and kinetic energies of a working fluid into mechanical work with the aid of a multistage turbine, said method including the step of discharging said fluid from at least the second rotatable stage to the last rotatable stage at a substantially constant relative exit Mach number having a magnitude in the order of from 1.0 to 1.3 when the working fluid is a superheated steam.

31. The method as defined in claim 30 which also includes the step of preaccelerating said fluid to a maximum absolute velocity prior to its entry into the first rotatable stage of said turbine, and discharging said fluid at the exit from the first rotatable stage at substantially the same exit Mach number as the exit Mach number from the remaining rotatable stages of said turbine.

32. The method of converting the heat and potential energies of a working fluid into mechanical work with the aid of a multistage turbine, said method including the steps of expanding said fluid without producing any mechanical work from an absolute approach velocity $C_0$ to an absolute exit velocity $C_1$, and a local exit Mach number $M_{c_1}$, and thereafter expanding said fluid at very nearly constant relative exit Mach numbers $M_{w_x}$, equal to $M_{c_1}$ in the rotatable stages of the turbine for producing said mechanical work.

33. A method of converting a total available potential energy of a working fluid into mechanical work with the aid of a multistage turbine, said method including the steps of converting a first portion of said potential energy into a first portion of kinetic energy at the entry into said turbine, distributing and apportioning said first portion of kinetic energy as a first set of kinetic energy increments distributed among all the rotatable stages of said turbine, converting the remaining second portion of said total available potential energy into an additional second set of increments of kinetic energy in each rotatable stage of said turbine to supplement the first set, and fixing the magnitudes of the first and second sets so as to produce substantially equal energy conversions, high total momentum high total torque and high tangential torque in each stage of said turbine.

34. The method as defined in claim 33 which also includes the additional step of making the relative exit Mach number from each rotatable stage substantially constant and equal to from 1.0 to 1.3 when the working fluid is a superheated steam.

35. The method as defined in claim 33 which includes the additional steps of making the direction of flow and expansion of said flow through said turbine a radial, centrifugal flow, and making the radial centrifugal velocity of said fluid substantially constant.

36. The method as defined in claim 33 which included the additional steps of making the direction of flow and expansion of said fluid through said turbine an axial flow, parallel to the longitudinal axis of said turbine, and making the relative exit Mach number from each rotatable stage substantially constant and equal to from 1.0 to 1.3 when the working fluid is a superheated steam.

37. A method of converting a potential energy of a working fluid into mechanical work with the aid of a multistage turbine including the steps of converting a portion of said potential energy into a first portion of kinetic energy at the entry into said turbine without producing any mechanical work, transmitting successively diminishing portions of said first portion of kinetic energy through all the rotatable stages of said turbine while simultaneously generating supplemental increments of kinetic energy in every stage with the aid of the remaining portion of said potential energy, and proportioning the received and the locally generated portions of the kinetic energy in each stage to produce substantially constant relative exit velocity Mach number in all rotatable stages of said turbine.

38. A high energy conversion turbine including an input stator and a plurality of interstage stators, a single rotor with a plurality of high energy conversion stages, the adjacent stages and stators having substantially the same width, degree of convergence of acceleration flow and expansion channels, and substantially the same turning angles producing peripheral components $C_{u_x}$ and $C_{u_{x+1}}$ of the absolute exit velocities from any given pair of a stage-stator combination which are greater than the mean peripheral velocity $U_x$ of the given stage, except the peripheral component of the absolute exit velocity from the last stage of said turbine, and substantially constant width interstage air gaps between adjacent stages and stators to produce direct fluid dynamic coupling and discharge of a working fluid from the stages into the stators and from the stators into the stages.

39. The turbine as defined in claim 38 in which the turning angle of the input stator and of the first stage is in the order of from 90° to 140° and the remaining stages and stators have decreasing turning angles.

40. The turbine as defined in claim 38 in which the turning angles of the interstage stators and of the stages are substantially the same and are constant from the first stage to the last stator but is smaller in the last stage.

41. The turbine as defined in claim 38 in which said turbine is a single rotation centrifugal, radial flow turbine.

42. The turbine as defined in claim 38 in which said turbine is a single rotation axial flow turbine.

References Cited by the Examiner

UNITED STATES PATENTS

| | | | |
|---|---|---|---|
| 1,749,528 | 3/1930 | Freudenreich et al. | 253—77 |
| 1,845,955 | 2/1932 | Bonom. | |
| 2,471,892 | 5/1949 | Price | 230—134 X |

FOREIGN PATENTS

| | | |
|---|---|---|
| 1,005,323 | 3/1957 | Germany. |
| 743,475 | 1/1956 | Great Britain. |

MARTIN P. SCHWADRON, *Primary Examiner.*

SAMUEL LEVINE, E. A. POWELL, *Assistant Examiners.*